US009998435B1

(12) United States Patent
Kothari et al.

(10) Patent No.: US 9,998,435 B1
(45) Date of Patent: *Jun. 12, 2018

(54) SYSTEM AND METHOD TO ANONYMIZE DATA TRANSMITTED TO A DESTINATION COMPUTING DEVICE

(71) Applicant: Ciphercloud, Inc., San Jose, CA (US)

(72) Inventors: Pravin Kothari, San Jose, CA (US); Malakondayya Gorantla, Santa Clara, CA (US)

(73) Assignee: CIPHERCLOUD, INC., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/252,157

(22) Filed: Aug. 30, 2016

Related U.S. Application Data

(63) Continuation of application No. 14/609,402, filed on Jan. 29, 2015, now Pat. No. 9,432,342, which is a continuation-in-part of application No. 13/844,353, filed on Mar. 15, 2013, now Pat. No. 9,413,526, which is a continuation-in-part of application No. 13/042,459, filed on Mar. 8, 2011, now Pat. No. 8,694,646, and a continuation-in-part of application No. 13/323,821, filed on Dec. 13, 2011, now Pat. No. 8,726,398.

(51) Int. Cl.
| | |
|---|---|
| *H01L 29/06* | (2006.01) |
| *H04L 29/06* | (2006.01) |
| *G06F 21/62* | (2013.01) |
| *H04L 9/08* | (2006.01) |

(52) U.S. Cl.
CPC ...... *H04L 63/0478* (2013.01); *G06F 21/6254* (2013.01); *H04L 9/08* (2013.01); *H04L 63/0421* (2013.01); *H04L 63/0435* (2013.01); *H04L 63/061* (2013.01)

(58) Field of Classification Search
CPC .... H04L 63/0478; H04L 9/08; G06F 21/6254
See application file for complete search history.

(56) References Cited

U.S. PATENT DOCUMENTS

| | | | | |
|---|---|---|---|---|
| 5,796,839 | A * | 8/1998 | Ishiguro | G11B 20/00086 380/277 |
| 6,098,056 | A * | 8/2000 | Rusnak | G06Q 20/3821 705/75 |
| 7,716,291 | B2 * | 5/2010 | Thorson | G06Q 20/085 705/50 |

(Continued)

OTHER PUBLICATIONS

Lie, David, et al. "Architectural support for copy and tamper resistant software." ACM SIGPLAN Notices 35.11 (2000): 168-177.*

(Continued)

*Primary Examiner* — Chau Le

(74) *Attorney, Agent, or Firm* — Minisandram Law Firm; Raghunath S. Minisandram

(57) ABSTRACT

A method and system for anonymizing data is disclosed. Data to be anonymized is received by an anonymization system. A request for a data encryption key is generated. A masked data encryption key is received in response to the request. The data encryption key is retrieved from the masked data encryption key. The data is anonymized using an anonymization module to derive an anonymized data using the data encryption key.

18 Claims, 18 Drawing Sheets

(56) References Cited

U.S. PATENT DOCUMENTS

| | | | |
|---|---|---|---|
| 2004/0234074 A1* | 11/2004 | Sprunk | H04L 9/302 380/28 |
| 2006/0050870 A1* | 3/2006 | Kimmel | H04L 63/0428 380/30 |
| 2006/0085454 A1* | 4/2006 | Blegen | G06F 21/6254 |
| 2006/0280191 A1* | 12/2006 | Nishida | H04L 63/0421 370/401 |
| 2009/0214044 A1* | 8/2009 | Kinoshita | G06F 21/602 380/283 |
| 2010/0064354 A1* | 3/2010 | Irvine | G06F 21/6218 726/5 |
| 2010/0229241 A1* | 9/2010 | Liu | G06F 21/6254 726/26 |
| 2010/0306635 A1* | 12/2010 | Tang | H04L 9/0822 714/807 |
| 2010/0313009 A1* | 12/2010 | Combet | G06Q 30/0204 713/150 |
| 2013/0305054 A1* | 11/2013 | Burchett | H04L 9/3213 713/185 |
| 2015/0006895 A1* | 1/2015 | Irvine | G06F 21/6254 713/171 |
| 2017/0083604 A1* | 3/2017 | Syed-Ebrahim | G06F 17/30424 |

OTHER PUBLICATIONS

Eschenauer, Laurent, and Virgil D. Gligor. "A key-management scheme for distributed sensor networks." Proceedings of the 9th ACM conference on Computer and communications security. ACM, 2002.*

Zhang, Qiong, and Yuke Wang. "A centralized key management scheme for hierarchical access control." Global Telecommunications Conference, 2004. GLOBECOM'04. IEEE. vol. 4. IEEE, 2004.*

Du, Wenliang, et al. "A key management scheme for wireless sensor networks using deployment knowledge." INFOCOM 2004. Twenty-third AnnualJoint conference of the IEEE computer and communications societies. vol. 1. IEEE, 2004.*

* cited by examiner

500

| APP- SA0 | TYPE | LENGTH | RETAIN | ANON STRATEGY |
|---|---|---|---|---|
| DATA FIELD 1 | NUMERIC | 10 | 10:08 | TPF1 |
| DATA FIELD 2 | ALPHA | 24 | None | TPF2 |
| DATA FIELD 3 | ALP-NUM | 40 | None | TPF1 |
| DATA FIELD 4 | ALPHA | 8 | None | TPF4 |
| DATA FIELD 5 | ALPHA | 32 | None | TPF5 |
| DATA FIELD 6 | ALP-NUM | 16 | None | TPF2 |
| DATA FIELD 7 | NUMERIC | 48 | None | TPF6 |
| DATA FIELD 8 | ALP-NUM | 24 | None | None |

FIGURE 5

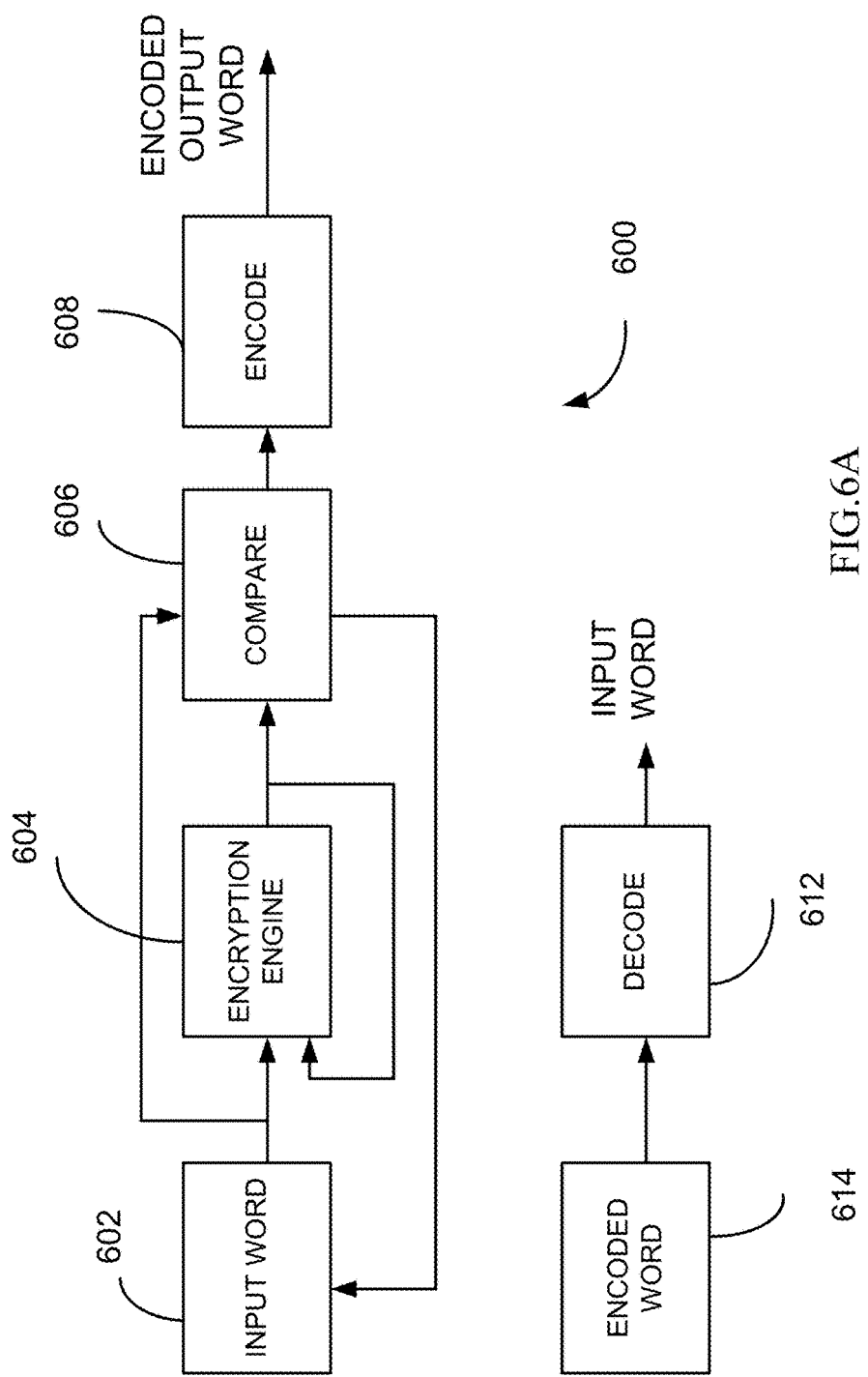

| ITERATION | INPUT | RANGE OF CHARACTERS |
|---|---|---|
| 0 | x | ABCDEFGHIJKLMNOPQRSTUVWXYZ |
| 1 | 0 | ABCDEFGHIJKLMNOPQRSTUVWXYZ |
| 2 | 1 | ABCDEFGHIJKLMNOPQ |
| 3 | 1 | DEFGHIJKLMNOPQ |
| 4 | 0 | FGHIJKLMNOPQ |
| 5 | 0 | FGHIJ |
| 6 | x | FGH |

652 — ITERATION
654 — INPUT
656 — RANGE OF CHARACTERS
658, 660, 662, 664, 666, 668
650

FIG.6C

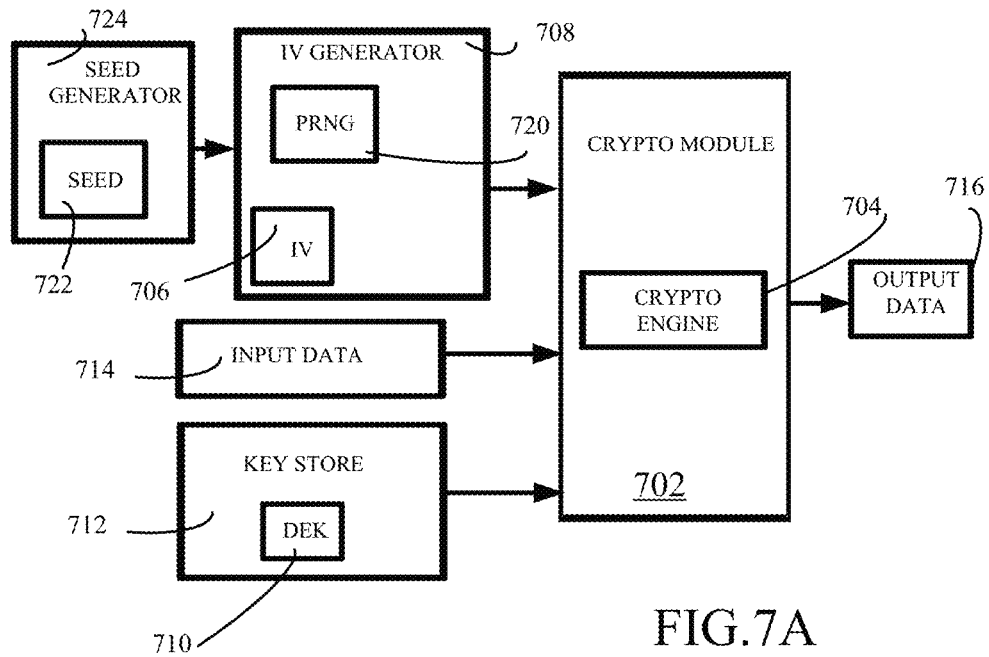
FIG.7A
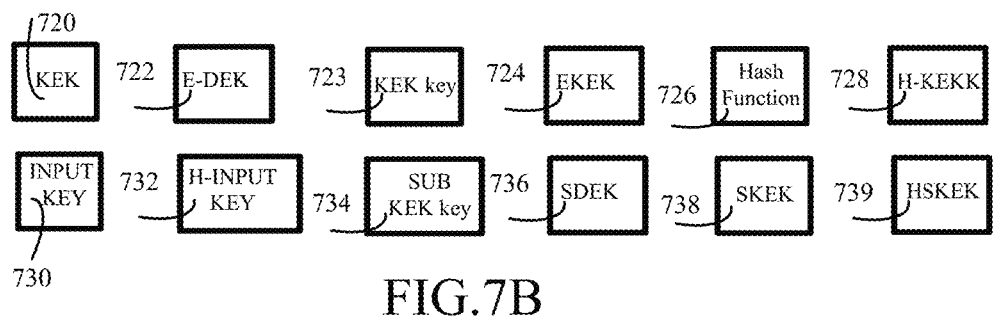
FIG.7C
FIG.7B

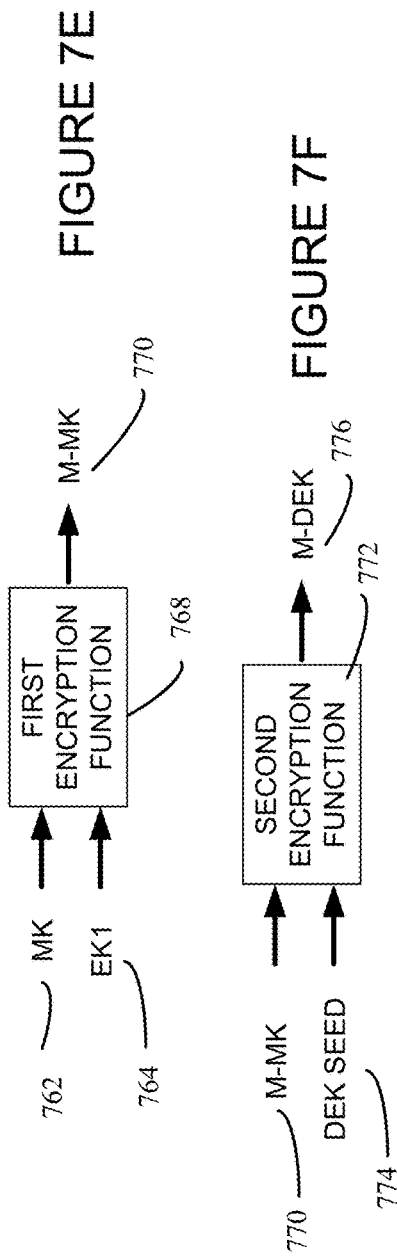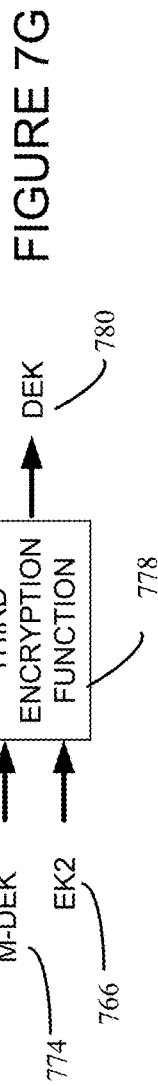

POST ACTION WITHOUT ANONYMIZATION

CONFIRMATIONTOKEN=D_50pD0Su2DOuFvjle8LLIqm.GsZ_1o9A5xyMTUhEgGRHn1_wLcw1A534jF8R_fsMpDZEiz ZnR.gLnzEuTQW_OcdKSvBVZUvsOPAqV.MzcOg7f8ZXplu6MniAFOb.BVW8kIn.ONoK9MuDte_lnYJAv7kSmg%3D&ca ncelURL=%2F001C000000n6wyJ&id=001C000000n6wyJ&retURL=%2F001C000000n6wyJ&save_new_url=%2F001%2Fe% 3FretURL%3D%252F001C000000n6wyJ&save=Saving...&acc10=&acc2=Test+Account+1&acc11=&acc3_lkid=0000000000 00000&acc3_lkold=null&acc3_lktp=001&acc3_lspf=0&acc3_lspfsub=0&acc3_mod=0&acc3=&acc12=&acc6=&acc15=&acc 7=&acc8=&acc20=&acc17street=&acc18street=&acc17city=&acc18city=&acc17state=&acc18state=&acc17zip=&acc18zip= &acc17country=&acc18country=&sysMod=12da5ed4b20

POST ACTION WITH ANONYMIZATION

CONFIRMATIONTOKEN=D_50pD0Su2DOuFvjle8LLIqm.GsZ_1o9A5xyMTUhEgGRHn1_wLcw1A534jF8R_fsMpDZEiZnR.g LnzEuTQW_OcdKSvBVZUvsOPAqV.MzcOg7f8ZXplu6MniAFOb.BVW8kIn.ONoK9MuDte_lnYJAv7kSmg%3D&cancelURL=% 2F001C000000n6wyJ&id=001C000000n6wyJ&retURL=%2F001C000000n6wyJ&save_new_url=%2F001%2Fe% 3FretURL%3D%252F001C000000n6wyJ&save=Saving...&acc10=&acc2=TPF1KakgfkojalTSF+TPF1BmhaehkddfamalTSF+1 &acc11=&acc3_lkid=000000000000000&acc3_lkold=null&acc3_lktp=001&acc3_lspf=001&acc3_lspfsub=0&acc3_mod=0&acc3=&a cc12=&acc6=&acc7=&acc8=&acc15=&acc20=&acc17street=&acc18street=&acc17city=&acc18city=&acc17state=&acc18state=&a cc17zip=&acc18zip=&acc17country=&acc18country=&sysMod=12da5ed4b20

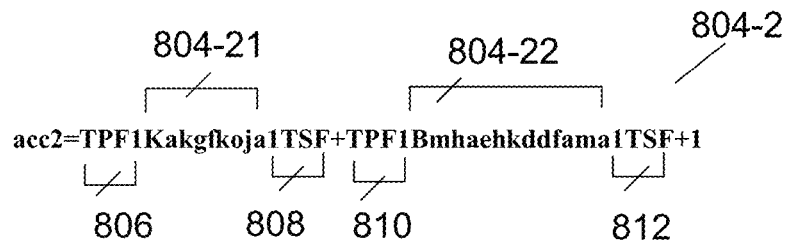

804-21   804-22   804-2 acc2=TPF1Kakgfkoja1TSF+TPF1Bmhaehkddfama1TSF+1

GET ACTION RESPONSE FROM HOSTED CLOUD

```
...
<tr class="dataRow even last first">
<th scope="row" class="dataCell">
<a href="/001C000000n6wyJ">TPF1Kakgfkoja1TSF TPF1Bmhaehkddfama1TSF 1</a>
</th>
...
</tr>
...
```
904    906

FIGURE 9B

GET ACTION RESPONSE TO USER COMPUTER

```
...
<tr class="dataRow even last first">
<th scope="row" class="dataCell">
<a href="/001C000000n6wyJ">Test Account 1</a>
</th>
...
</tr>
...
```
908    910

FIGURE 9C

SYSTEM AND METHOD TO ANONYMIZE DATA TRANSMITTED TO A DESTINATION COMPUTING DEVICE

CROSS-REFERENCE TO RELATED APPLICATIONS

This application is a continuation application of application Ser. No. 14/609,402 filed on Jan. 29, 2015, which is a continuation-in-part of application Ser. No. 13/844,353 filed on Mar. 15, 2013, which is a) continuation-in-part of application Ser. No. 13/042,459 filed on Mar. 8, 2011 and b) continuation-in-part of application Ser. No. 13/323,821 filed on Dec. 13, 2011. Contents of application Ser. Nos. 14/609, 402, 13/844,353, 13/042,459 and 13/323,821 are all incorporated herein by reference, in their entirety.

TECHNICAL FIELD

The present invention relates generally to transmitting data to and retrieving data from a destination computing device and particularly, to anonymize data transmitted to the destination computing device and de-anonymize data retrieved from the destination computing device.

DESCRIPTION OF RELATED ART

The Internet has enabled computer users all over the world to interact, communicate, store and access information electronically. One particularly popular mode for running applications over the internet is to host application on a server located in a remote location, along with data associated with the applications. The users of the application access the application and associated data over the internet. Sometimes, this mode of running applications in a remote location is referred to as cloud computing. It is not uncommon for the application to be hosted on a server owned or controlled by a third party. And, various clients or users of the application run the application hosted on the server at the third party location and store data corresponding to the application on a data storage device, for example, a database running on a computing device at the third party location.

There are multiple benefits of using a third party hosted application to a client. For example, the application may be managed by subject matter experts who are familiar with the application, for example a customer relationship management (CRM) application. Sometimes, ancillary applications and resources needed to provide best in class application may be made available to all the clients of the application. The third party may be able to allocate resources based on varying or seasonal demands of each of its customers.

As more and more enterprises or customers use applications hosted at third party locations, the data associated with the enterprise may need to be protected from unauthorized access. Some of the data security requirements may be imposed by regulatory bodies. Some of the data security requirement may be client specific.

As more and more applications are hosted at the third party locations and corresponding data is stored at the third party locations, there is a need to find efficient ways to provide data security to the data stored at the third party locations. With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method for anonymizing data is disclosed. Data to be anonymized is received by an anonymization system. A request for a data encryption key is generated. A masked data encryption key is received in response to the request. The data encryption key is retrieved from the masked data encryption key. The data is anonymized using an anonymization module to derive an anonymized data using the data encryption key.

In yet another embodiment, a system to anonymize data is disclosed. Data to be anonymized is received by an anonymization system. A request for a data encryption key is generated. A masked data encryption key is received in response to the request. The data encryption key is retrieved from the masked data encryption key. The data is anonymized using an anonymization module to derive an anonymized data using the data encryption key.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIG. 5 shows an exemplary anonymization strategy data table, according to one aspect of the present invention;

FIG. 6A shows an exemplary block diagram of a searchable encryption system, according to one aspect of the present disclosure;

FIG. 6C shows an exemplary table 650 showing various iterations of the decoding operation of the searchable encryption system of FIG. 6A, according to one aspect of the present disclosure.

FIG. 7A shows an exemplary crypto module, according to one aspect of the present disclosure;

FIG. 7B shows one or more exemplary data fields used, according to one aspect of the present disclosure;

FIG. 7C shows exemplary combination of values in one or more data fields described with reference to FIG. 7B, according to one aspect of the present disclosure;

FIG. 7E shows an example first crypto function of the example system of FIG. 7D;

FIG. 7F shows an example second crypto function of the example system of FIG. 7D;

FIG. 7G shows an example third crypto function of the example system of FIG. 7D;

FIG. 7H shows an example table for use in the example system of FIG. 7D;

FIG. 7J shows another example table for use in the example system of FIG. 7D;

FIGS. 8A-8D shows exemplary anonymization of data transmitted to a destination computing device;

FIGS. 9A-9C shows exemplary de-anomymization of data received from the destination computing device;

DETAILED DESCRIPTION

To facilitate an understanding of the adaptive aspects of the present invention, the general architecture and operation of a networked system is described. The specific architecture and operation of the adaptive aspects of the present disclosure are then described with reference to the general architecture.

Figure 1A:
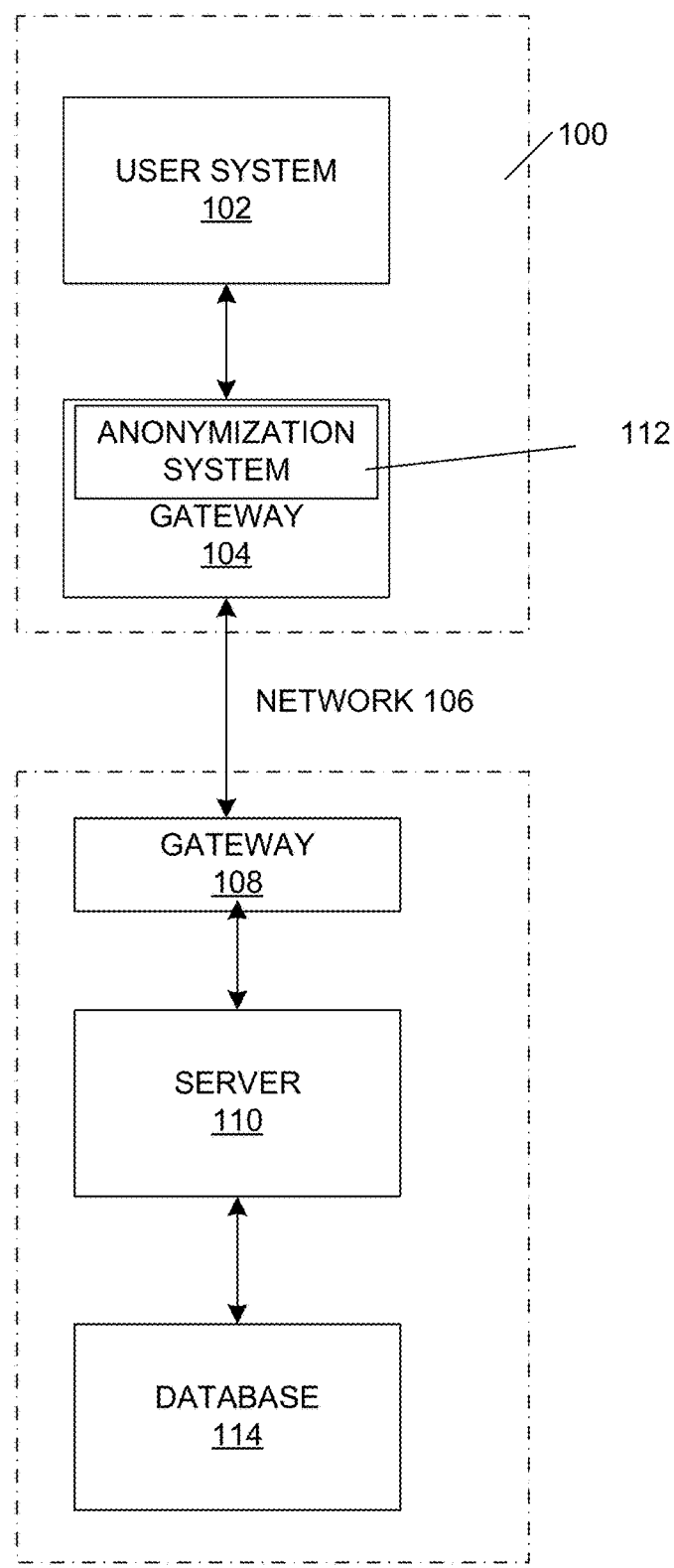
FIG. 1A shows a block diagram of a system with anonymization system of the present disclosure used to process requests from a user system to an application server, according to one aspect of the present disclosure.

FIG. 1A shows a top-level block diagram of a system 100 with anonymization system of this disclosure that is used to send data from a user system, according to one aspect of the present disclosure. System 100 includes a user system 102 that is coupled via a gateway 104 and a network connection 106 to a server 110 through another gateway 108. In one aspect, server 110 is a web-server. Gateway 104 in one embodiment includes an anonymization system 112 of this disclosure. Database 114 is used to store information that is accessed by the user system 102. In one aspect, database 114 is a structured query language (SQL) based database.

Figure 1B:
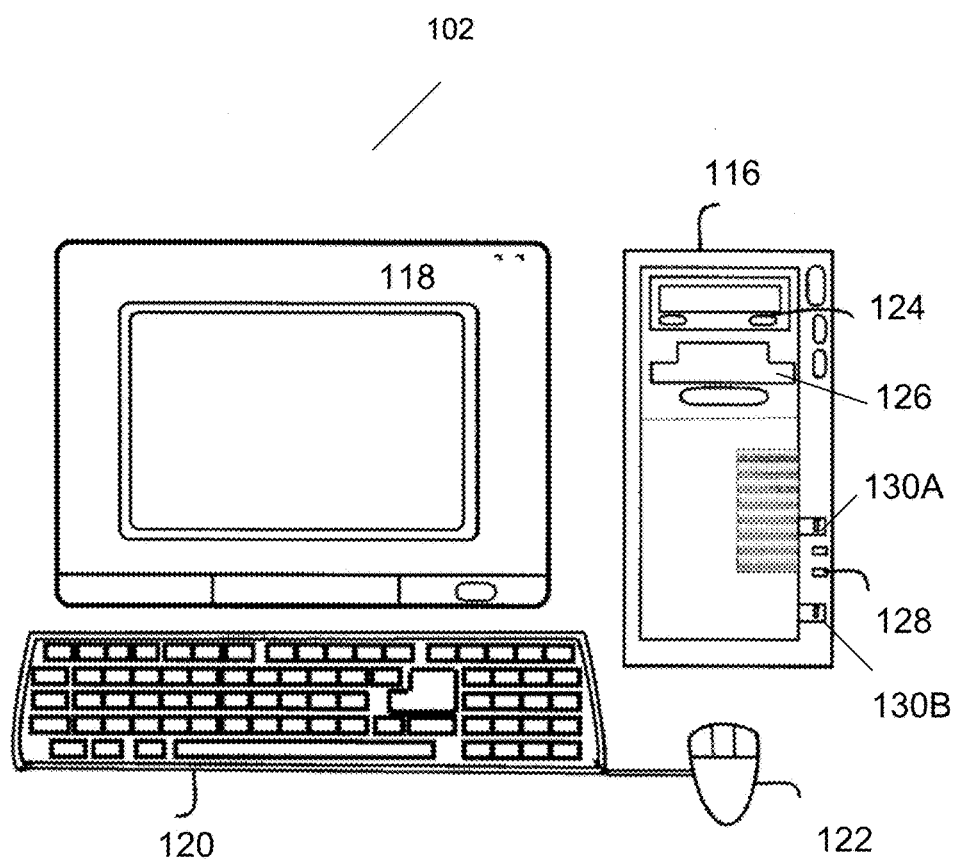
FIG. 1B shows a block diagram of the user system of FIG. 1 configured to communicate with a server over the network, according to one aspect of the present disclosure.

FIG. 1B is a block diagram of a user system 102 according to one embodiment of the present disclosure, which is configured to communicate with the server 110 over the network. FIG. 1B includes a user computer 116 (sometimes referred to as computer 116) and a monitor 118. Monitor 118 may be a CRT type, a LCD type, a plasma type, or any other type of color or monochrome display. Also provided with computer 116 is a keyboard 120 for entering text data and user commands, and a pointing device 122 (such as a mouse) for processing objects displayed on monitor 118. In some embodiments, objects displayed on monitor 118 may be elements of a graphical user interface.

Computer 116 may include a computer-readable memory medium such as a rotating disk 124 for storing readable data. Besides other programs, disk 124 can store application programs including web browsers by which computer 116 connects to a network and the systems described below, according to one aspect of the present disclosure. In some embodiments, disk 124 may be a disk system with a plurality of disk drives arranged as a Redundant Array of Inexpensive Drives (RAID) system, accessible using a storage adapter (not shown).

Computer 116 can also access a computer-readable storage device 126 with removable storage media storing data files, application program files, and computer executable process steps embodying the present invention or the like. For example, the storage device 126 may be a CD-ROM or a DVD ROM. In some embodiments, the storage device 126 may support removable storage media that is read-only device (R), write once-read many (WORM), or rewriteable (RW) type. In some embodiments, the storage device 126 may also be provided with computer 116 to access application program files, audio files and data files stored on a removable storage media. In some embodiments, the removable storage media may be optical, magnetic, magneto-optic, or semiconductor based recording media.

A modem, an integrated services digital network (ISDN) connection, wireless or the like also provides computer 116 with a DSL/Cable/satellite/wireless (or Internet connection) 128 to the World Wide Web (WWW). Internet connection 128 allows computer 116 to send and receive commands, data files, audio files, application program files and computer-executable process steps embodying the present invention.

Computer 116 is also provided with external audio speakers 130A and 130B to assist a listener to listen to music either downloaded on-line from the Internet or off-line using a storage medium. It is noteworthy that a listener may use headphones instead of audio speakers 130A and 130B to listen to music.

Figure 2:
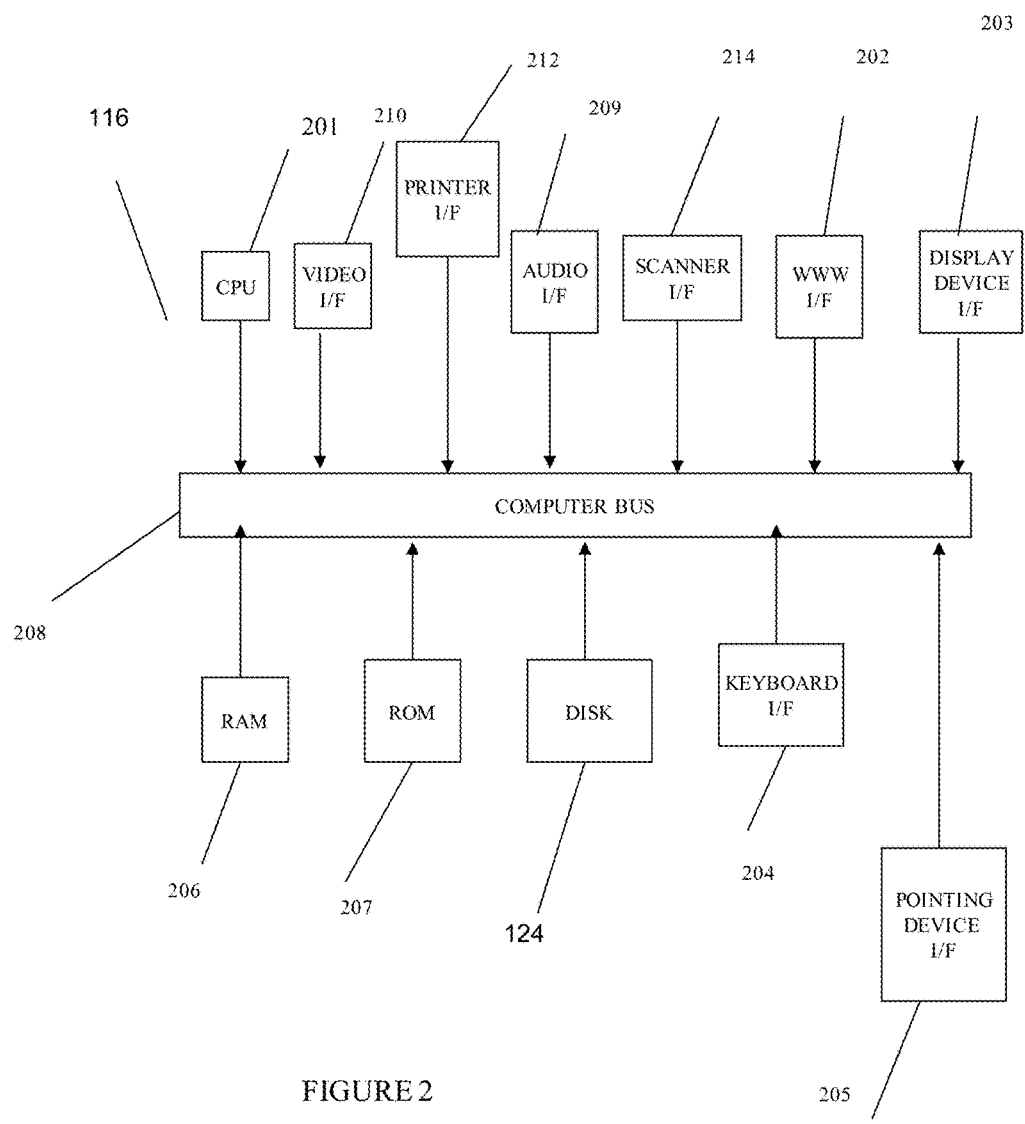
FIG. 2 shows a block diagram of the internal functional architecture of a user computer, according to one aspect of the present disclosure.

FIG. 2 is a block diagram showing the internal functional architecture of computer 116. As shown in FIG. 2, computer 116 includes a central processing unit (CPU) 201 for executing computer-executable process steps and interfaces with a computer bus 208. Also shown in FIG. 2 are a WWW interface 202, a display device interface 203, a keyboard interface 204, a pointing device interface 205, an audio interface 209, video interface 210, printer interface 212, and a disk 124. Audio Interface 209 allows a listener to listen to music, Online (downloaded using the Internet or a private network) or offline (using a CD).

As described above, disk 124 may store operating system program files, application program files, web browsers, and other files. Some of these files are stored on disk 124 using an installation program. For example, CPU 201 executes computer-executable process steps of an installation program so that CPU 201 can properly execute the application program.

A random access main memory ("RAM") 206 also interfaces to computer bus 208 to provide CPU 201 with access to memory storage. When executing stored computer-executable process steps from disk 124 (or other storage device such as storage device 126 or Internet connection 128), CPU 201 stores and executes the process steps out of RAM 206.

Read only memory ("ROM") 207 is provided to store invariant instruction sequences such as start-up instruction sequences or basic input/output operating system (BIOS) sequences for operation of keyboard 120.

Figure 2A:
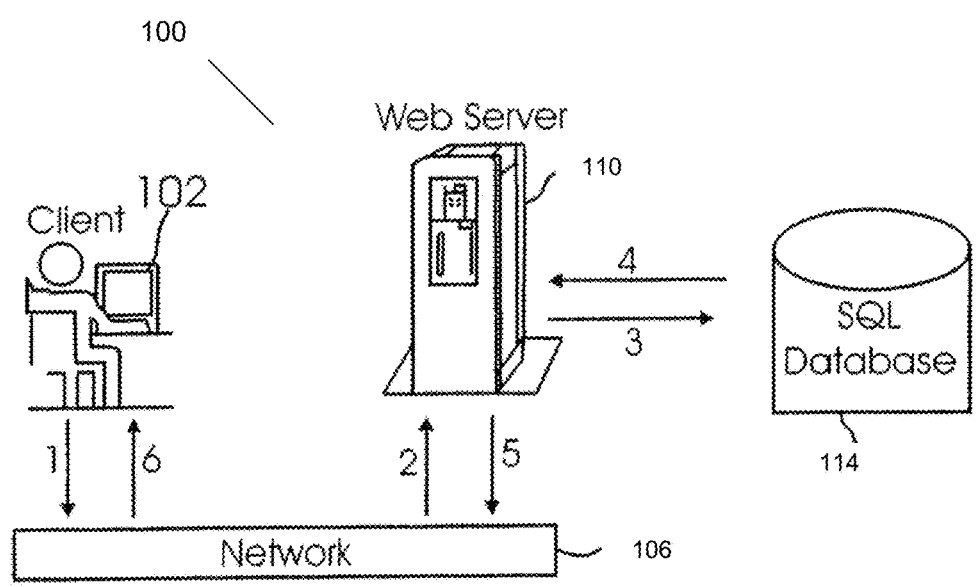
FIG. 2A shows a block diagram of another embodiment of a system used to service requests from a user computer, according to another aspect of the present disclosure.

FIG. 2A shows yet another example of the overall system 100, according to one aspect of the present disclosure. In FIG. 2A, server 110 is shown as a web server and database 114 is shown as a SQL (structured query language) database. FIG. 2A also shows the various steps that are used to access database 114. In step 1, a user using a browser running on the user system 102, submits a URL, as a request. URL includes the application to which the request is directed. In step 2, the web server 110 captures the request, and locates and executes corresponding application specific program (ASP) code for the application to which the request was directed.

In step 3, during execution of ASP code, a structured query language (SQL) code is generated and executed. Based on the executed SQL code, database 114 is accessed to fetch, add, modify or delete information in the database.

In step 4, the results are sent to the web server 110. The web server 110 constructs a response, for example as a HTML code. In step 5, HTML code is sent to the user system 102. In step 6, the HTML page is sent to the browser and displayed on the user system 102.

Although in this example, a user submits a URL as a request, in some embodiments, a user application executing on the user computer 102 may submit a request. The request may be submitted as a URL, and the user application may be configured to receive the response to the request.

Figure 3:
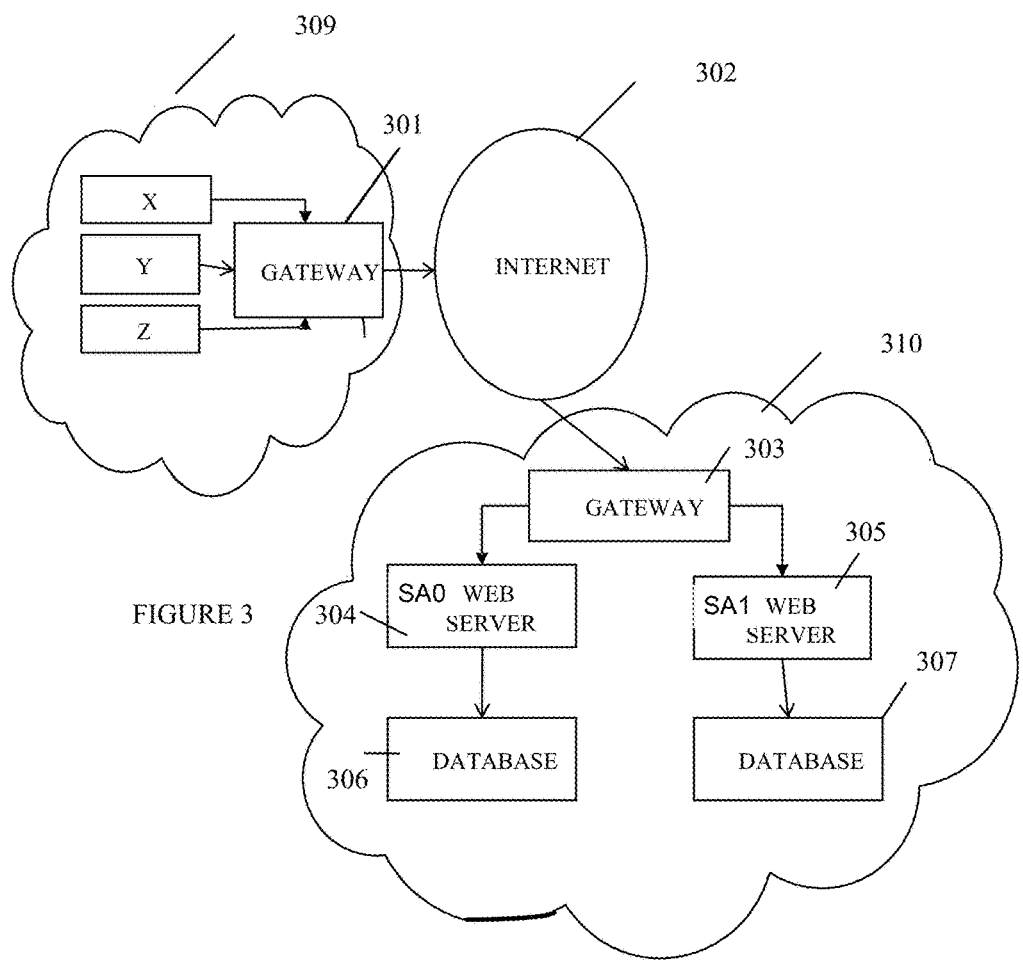
FIG. 3 shows an exemplary topology of computer network coupling user computers to servers over the internet, according to one aspect of the present disclosure.

Now, an exemplary coupling of the computer 116 to a server over the internet will be described with reference to FIG. 3. FIG. 3 shows an exemplary topology of a computer network with computers similar to computer 116, connected to the Internet 302. For illustration purposes, three computers X, Y and Z are shown connected to the Internet 302 via Web interface 202 through a gateway 301, where gateway 301 can interface N number of computers. Gateway 301 may be similar to gateway 104 with an anonymization system 112. Web interface 202 may be a modem, network interface card or a unit for providing connectivity to other computer systems over a network using protocols such as X.25, Ethernet or TCP/IP, or any device that allows, directly or indirectly, computer-to-computer communications. Gateway 301 and computers X, Y and Z may be located or controlled within a user controlled environment. This user controlled environment may be within the user controlled enterprise or intranet. For convenience, gateway 301 and computers X, Y and Z are grouped together and referred to as user cloud 309. Exemplary topology of a computer network may have additional groups of computers with gateway to define additional user clouds. In one embodiment, data flow outside the user cloud may need special handling.

It is noteworthy that the invention is not limited to a particular number of computers. Any number of computers can be connected to the Internet 302 or any other computer network may be used.

FIG. 3 further shows a second gateway 303 that connects a network of web servers 304 and 305 to the Internet 302. Web servers 304 and 305 may be connected with each other over a computer network. Web servers 304 and 305 receive requests from the user computer and respond to the requests received from the user computer. Web server 304 is coupled to a database 306 and web server 305 is coupled to a database 307. In one embodiment, the web server may be hosting an application for use by the user computer. As an example, web server 304 is hosting server application SA0 and web server 305 is hosting server application SA1. As one skilled in the art appreciates, server applications may be a hosted customer relationship management software (CRM) application, a website, online shop, news service, search applications, social networking applications, blog sites, webmail and the like.

In one embodiment, the gateway 303, servers 304 and 305, and databases 306 and 307 may be hosted at a third party location. For convenience, gateway 303, servers 304 and 305, and databases 306 and 307 are grouped together and referred to as hosted cloud 310. Exemplary topology of a computer network may have additional groups of servers with gateways and databases to define additional hosted clouds.

The following provides a brief description of the Internet. The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language ("XML") as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A web browser is a software program that allows users to access the content stored in Web sites. Modern Web browsers can also create content "on the fly", according to instructions received from a Web site. This concept is commonly referred to as "dynamic page generation". In addition, browsers can commonly send information back to the Web site, thus enabling two-way communication of the user and the Web site. A user can connect to the Internet via a proprietary network, such as America Online, or via an Internet Service Provider, e.g., Earthlink. The web browser may run on any computer connected to the Internet. Currently, various browsers are available of which two prominent browsers are Microsoft Internet Explorer and Mozilla Firefox. The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Web domain is an Internet address that provides connection to a Web server. Generally, URLs have three parts: the first part describes the protocol used to access the content pointed to by the URL, the second contains the directory in which the content is located, and the third contains the file that stores the content: <protocol>: <domain><directory><file>.

For example:
http://www.ciphercloud.com/bios.html
http://www.ciphercloud.com/index.html
http://fn.cnn.com/archives/may2009/pr3.html
ftp://user1.ciphercloud.com/software/pages.zip Commonly, the <protocol> part may be missing. In that case, modern Web browsers access the URL as if the http://prefix was used. In addition, the <file> part may be missing. In that case, one of the convention calls for the file "index.html" to be fetched. In some cases, the request may be redirected to fetch another default file.

For example, the following are legal variations of the previous example URLs:
www.ciphercloud.com/bios.html
www.ciphercloud.com
fn.cnn.com/archives/may2009/pr3.html
ftp://user1.ciphercloud.com/software/pages.zip Web Page.

Web page is the content associated with a URL. In its simplest form, this content is static text, which is stored into a text file indicated by the URL. However, very often, the content contains multi-media elements (e.g. images, audio, video, etc) as well as non-static text or other elements (e.g. news tickers, frames, scripts, streaming graphics, etc). Very often, more than one file forms a Web page. However, there is only one file that is associated with the URL and which initiates or guides the Web page generation.

When a Web browser receives an URL, the Web browser requests a Domain Name System (DNS) name server to decode the domain name and return the IP address for the domain name. The DNS name server returns the IP address of the domain name as stored in the DNS name server to the web browser. Web browser uses the IP address for the domain name and sends a request corresponding to the requested URL that confirms to the HTTP protocol to the IP address. In one embodiment, the request is sent using TCP/IP protocol over the internet.

In one embodiment, the user computer 116 sends requests to the server using HTTP protocol. As previously described with reference to FIG. 2A, the request is processed by the web server and a response is sent to the user computer. In the exemplary topology described with reference to FIG. 3, the request is sent over the internet to the server. In some embodiment, requests may be sent using Hypertext Transfer Protocol Secure (HTTPS) protocol, which is a combination of HTTP protocol with SSL/TLS protocol to provide encrypted communication and secure identification of a network web server.

Figures 4, 4A:
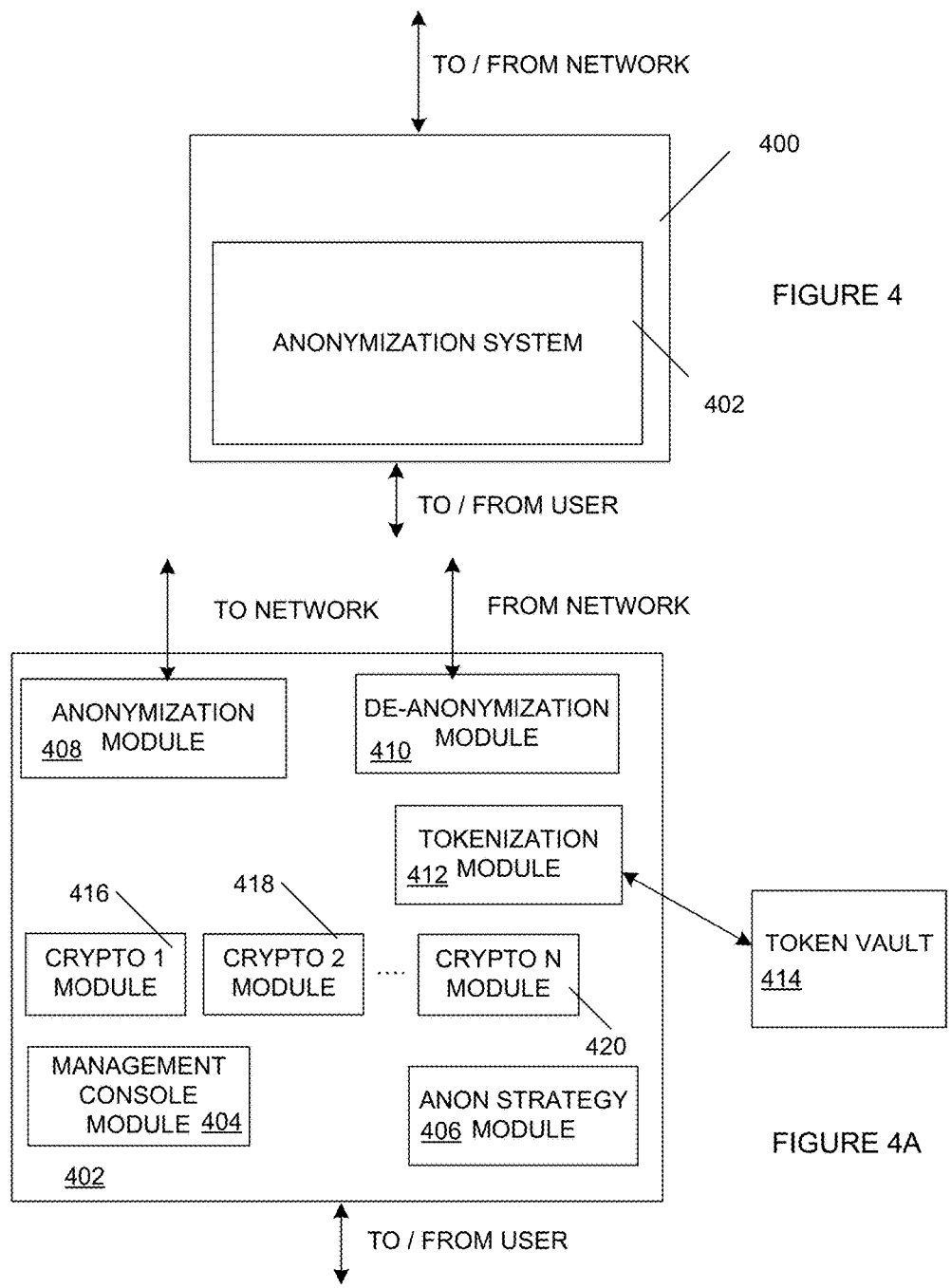
FIGS. 4 and 4A show an exemplary block diagram of an anonymization system, according to one aspect of the present disclosure.

Now, one embodiment of an anonymization system 402 is described with reference to FIG. 4. Anonymization system 402 may be similar to anonymization system 112. FIG. 4 shows the anonymization system 402 as part of gateway 400 that connects to the network, but the anonymization system 402 can be provided in other ways, such as software running on a server, distributed software, or various software and hardware packages operating together. In one embodiment, the anonymization system 402 may be part of the gateway described with reference to FIG. 1A and FIG. 3. The gateway 400 is configured to communicate with the user systems within the user cloud and communicate with the hosted cloud over the network. The anonymization system 402 will be described in detail, with reference to FIG. 4A.

Now referring to FIG. 4A, the anonymization system 402 includes a management console module 404, an anonymization strategy module 406, anonymization module 408, de-anonymization module 410, tokenization module 412 and one or more crypto modules, shown as crypto 1 module 416, crypto 2 module 418 and crypto N module 420. Additionally, a token vault 414 is also part of the anonymization system 402. As one skilled in the art appreciates, various modules referenced in this disclosure may be implemented in hardware, software executed on a computing device or a combination of hardware and software. Additionally, various modules may be implemented as an integrated unit or may be implemented as separate functional units that interact with each other using a communication protocol.

The management console module 404 is configured to communicate with various applications running on the hosted cloud, over the network. Additionally, the management console module 404 is also configured to communicate with the user computer. For example, the management console module 404 may send queries to various applications running on the hosted cloud and receive meta data (or data schema, data definitions) of each application.

The management console module 404 may also present the received meta data information about the applications running on the hosted cloud to the user. The management console module 404 may additionally present the available anonymization strategies for each data field of the meta data to the user computer. The user may select one or more of the anonymization strategies to be applied to various data fields of the application, using the user computer.

The selected anonymization strategy is stored by the management console module 404 in the anonymization strategy module 406, for later use by other modules of the anonymization system 402. The anonymization strategy may be stored as a table in the anonymization strategy module 406. The anaonymization strategy in one embodiment may include schema definition for data manipulation. An exemplary selected anonymization strategy will be described later with reference to FIG. 5.

The anonymization module 408 is configured to intercept any data to be transmitted from a user computer to the hosted cloud. The anonymization module 408 is also configured to communicate with the anonymization strategy module 406 and evaluate various fields of data to be transmitted against anonymization strategy stored in the anonymization strategy module 406. Based upon this evaluation, the anonymization module 408 is configured to perform anonymization of one or more data fields using one or more of the tokenization module 412 and crypto modules, for example, cryptol module 416 and crypto 2 module 418 and generate corresponding anonymized data field.

The anonymization module 408 is also configured to reassemble the data to be transmitted to the hosted cloud, using the anonymized data fields. In one embodiment, the reassembled data includes one or more unique data pattern added to the anonymized data fields to indicate the selected anonymization strategy used to anonymize the data fields. In one embodiment, a preamble is appended to the beginning of the anonymized data field. In one embodiment, a postamble is appended to the end of the anonymized data field. The reassembled data is forwarded to the hosted cloud over the network using the gateway 400. Various functions and features of the tokenization module 412 and crypto modules will be described later.

The de-anonymization module 410 is configured to intercept any data received by the user computer from the hosted cloud. The de-anonymization module 408 is also configured to evaluate various fields of data received from the hosted cloud to detect and decode the preamble and postamble of the data fields. Based upon this evaluation, the de-anonymization module 410 is configured to perform de-anonymization of one or more data fields using one or more of the tokenization module 412 and crypto modules, for example, crypto 1 module 416 and crypto 2 module 418 and generate corresponding de-anonymized data field. The de-anonymization module 410 is also configured to reassemble the data to be transmitted to the user computer, using the de-anonymized data fields. The reassembled data is forwarded to the user computer.

Now, referring to FIG. 5, an exemplary anonymization strategy data table 500 for server application SA0 stored by the anonymization strategy module 406 is described. As one skilled in the art appreciates, the anonymization strategy data may be stored in other forms other than a table form. Column 502 shows various data fields of server application SA0. Each of the rows of table 500 shows the data field and their corresponding characteristics. As an example, Column 504 shows data type for each of the data fields, for example numeric, alphabetical or alpha-numeric characters. Column 506 shows the length of the data field. Column 508 shows whether any portion of the data field needs to be retained as originally provided by the user computer. Column 510 shows the selected anonymization strategy for each of the data fields.

Now referring to row 512, various attributes of DATA FIELD 1 is stored in table 500. For example, DATA FIELD 1 is a numeric field of length 10 characters. Characters 8 through 10 of DATA FIELD 1 needs to be retained in its original form. The selected anonymization strategy for DATA FIELD 1 is TPF1. For example, DATA FIELD 1 may be a telephone number and characters 10:08 may represent the area code of the telephone number and may have to be maintained in its original form at the hosted cloud. However, characters 07:01 will be anonymized using anonymization strategy TPF1. In one embodiment, TPF1 may correspond to anonymization using tokenization module 412. In one embodiment, TPF1 may correspond to anonymization using Crypo 1 module 416. In one embodiment, a preamble indicative of TPF1 anonymization strategy may be appended to the anonymized DATA FIELD 1.

Now referring to row 514, various attributes of DATA FIELD 4 is stored in table 500. For example, DATA FIELD 4 is an alphabetic field of length 8 characters. No characters need to be retained in its original form. The selected anonymization strategy for DATA FIELD 4 is TRF4. In one embodiment, TRF4 may correspond to anonymization using crypto 2 module 418. In one embodiment, TRF4 may correspond to anonymization using crypto N module 420. In one embodiment, a preamble indicative of TRF4 anonymization strategy may be appended to the anonymized DATA FIELD 4.

Now referring to row 516, various attributes of DATA FIELD 8 is stored in table 500. For example, DATA FIELD 8 is an alpha-numeric field of length 24 characters. No characters need to be retained in its original form. The selected anonymization strategy for DATA FIELD 8 is none. Based on this selection, no anonymization of DATA FIELD 8 will be performed and the data contained in DATA FIELD 8 will be sent in its original form.

Now various anonymization techniques implemented in various anonymization modules like tokenization module 412 and crypto modules like crypto 1 module, crypto 2 module and the like will be described. The anonymization technique selected for a data field may be based upon multiple factors. One of the factors is level of desired security. One of the other factors is data attribute preservation for the data field. The data attribute preservation refers to retaining capabilities to perform operations on the stored data field in their anonymized form as compared to the stored data in its original or clear form. Some of the operations that may be performed on the stored data field in their anonymized form include sorting in the order of their clear data form (or original data form), searching, searching regardless of the case of the characters, searching using partial string match or wild card match. As one skilled in the art appreciates, as more data attributes are preserved in the stored data form, in some embodiments, it may lead to decreased level of data security. Clear data or original data refers to the data as present in the data field before anonymization.

Anonymization techniques may be broadly divided into two categories. One, a token based anonymization. The token based anonymization may be implemented in the tokenization module 412 and may require local storage of the tokens in the token vault 414. Another technique is to use a symmetric key encryption based anonymization. Symmetric key encryption based anonymization technique may be implemented in one or more of the crypto modules, for example, crypto module 1, crypto module 2 and the like. Now, various anonymization techniques for each of the token based anonymization and symmetric key encryption based techniques will be described.

Token Based Anonymization Techniques:

Random token anonymization: In this technique, for data contained in each data field, a corresponding token is created. The token vault 414 is used to store the relationship between the original or clear data and the corresponding token. The token is sent to the hosted cloud, after prepending a preamble indicative of the type of anonymization performed on the data field. When the data field is retrieved from the hosted cloud, based on the preamble indicative of the type of anonymization performed, the token is used to extract the corresponding clear data stored in the token vault 414. The de-anonymized data is then forwarded to the user computer.

Sortable token anonymization: In this technique, the token vault is organized in a balanced, ordered tree, with each node representing a specific token that corresponds to a specific clear data. For an input data, the tokenization module 412 looks up the tree in the token vault 414 for a node that has not been used for clear data corresponding to the input data and establish a new token that corresponds to the input data. The new token is mapped to the input data. The new token in the selected node maintains the order of the tree. In this way, the token continues to maintain the order that corresponds to the original or clear data. The order may correspond to the position, sequence, or value of the original data. For example, the order may be based on alphabetical sequence, numerical sequence, value of the characters based on an assigned value or value of the characters based on a pre-assigned value, for example, Unicode value. The new token is then sent to the hosted cloud.

Token anonymization that allows case-insensitive search: In one embodiment, for each data, two tokens are generated. One, based on the original or clear form of the data and the other based on all lower cases. In one embodiment, random token anonymization technique is used, as described above. Both of the generated tokens are sent to the hosted cloud, with the token corresponding to all lower case is stored in a hidden field in the application.

When a search request is received for this field from the user computer, for example, as a keyword in clear form, search request is generated by the anonymization system 402, for both the clear form and all lower case. For example, anonymized keywords are generated, one based on the keyword in its original form and another based on keyword with all lower cases. The search request is then sent to the host cloud, with anonymized keyword for both clear form and all lower case. In one embodiment, the search request is sent with an "OR" logic so as to receive search results for both the keywords. Any results of the search received from the host cloud for both the anonymized keyword for clear form and anonymized keyword for all lower case will then be de-anonymized by the de-anomymization module of the anonymization system. The de-anonymized results are then presented to the user computer. As one skilled in the art appreciates, a keyword received in a search request may be full data field, few characters of a data field or few characters with a wild card. Principles described herein will work for all of these cases, as the search request sent to the host cloud will be based on anonymized keyword.

Symmetric Key Encryption Techniques:

AES encryption per word, with hard coded salt: In this technique, the data field values are broken down into words. Each of the word is encrypted using AES encryption using a hard coded salt. This technique will generate same encrypted data for the same input data, for each encryption cycle. The encrypted data is stored in the hosted cloud. A search word for exact match may be issued by the user computer to the hosted cloud. Corresponding encrypted data for the search word is generated by the anonymization system and sent to the hosted cloud. Any hits for exact match is returned to the anonymization system by the hosted cloud. The hits for exact match are then de-anonymized by the de-anonymization module 410 and presented to the user computer.

AES encryption per word, with hard coded salt that allows case-insensitive search: In one embodiment, for each word, two encrypted data words are generated. One, based on the original or clear form of the data word and the other based on all lower case of the data word. In one embodiment, AES encryption with hardcoded salt anonymization technique is used, as described above. Both of the generated anonymized data are sent to the hosted cloud, with the anonymized data corresponding to all lower case is stored in a hidden field in the application. When a search request is received for this field from the user computer, search request is generated by the anonymization system 402, for both the anonymized data words and sent to the host cloud. In one embodiment, the search request is sent with an "OR" logic so as to receive search results for both the encrypted words. Any results of the search received from the host cloud by the anonymization system will then be de-anonymized and presented to the user computer.

Searchable encryption: In this technique, encryption algorithm is designed to encrypt words of text. The encrypted values preserve the properties of sorting and equality of the clear values. As an example, the equality can be either case-sensitive or case-insensitive. As another example, sorting may be either case-sensitive or case-insensitive. In one embodiment, accented characters may be treated as equal characters. i.e. a character "E" and "E" may be treated as equal or same. In one embodiment, accented characters may be treated as adjacent characters, with "E" positioned after "E". Some of these techniques may permit both order preserving property for the anonymized data and case-insensitive search capability. Exemplary searchable encryption to encode words of a text will now be described with reference to FIGS. 6A-6B.

FIG. 6A shows an exemplary block diagram of a searchable encryption system 600. The searchable encryption system 600 may be implemented in the anonymization system 402. The searchable encryption system 600 includes an input logic 602 to receive input word to be encrypted, an encryption engine 604, a compare logic 606 and an encode logic 608. Various elements of the encryption system 600 may be implemented in various functional modules of the anonymization system 402, for example, in the anonymization module 408, crypto modules 416-418, de-anonymization module 410 and the like. For example, the encryption engine 604 may be part of one of the crypto modules 416-420.

The input logic 602 is configured to receive the input word to be fed to the encryption engine 604. In one embodiment, the encryption engine 604 receives each of the characters of the input word and generate a random character as an output. The encryption engine 604 may include a Pseudo-Random Number Generation Algorithm (PRNG) to generate a random character as an output. The PRNG is preferably secure and is fast. One exemplary PRNG may be a RC4 cipher. In one embodiment, the generated random character will be within a predefined range of characters, which narrows in subsequent iterations, as will be described later.

The output of the encryption engine 604 is fed to the compare logic 606. The compare logic 606 is also configured to receive the corresponding input character as an input. The compare logic 606 is configured to compare generated output character of the encryption engine 604 with the corresponding input character in a first range of characters and generate a binary bit, based on whether the input character is higher in position or lower in position relative to the generated output character. As an example, a bit 0 is generated if the position is lower and a bit 1 is generated, if the position is higher relative to the generated output character. The generated output character is now fed as input to the encryption engine 604 to generate a second generated output character, within a second range of characters.

The second generated output character is again compared with the input character by the compare logic 606 and generate next bit of output based on the position of the input character relative to the second generated output character, within the second range of characters (which is smaller than the first range). The operation is repeated to generate additional output bits until the range is such that there are only two characters before or after the input character. Now, the next character of the input word is processed to generate second set of output bits. This operation will be further described with reference to FIG. 6B with table 620.

Figure 6B:
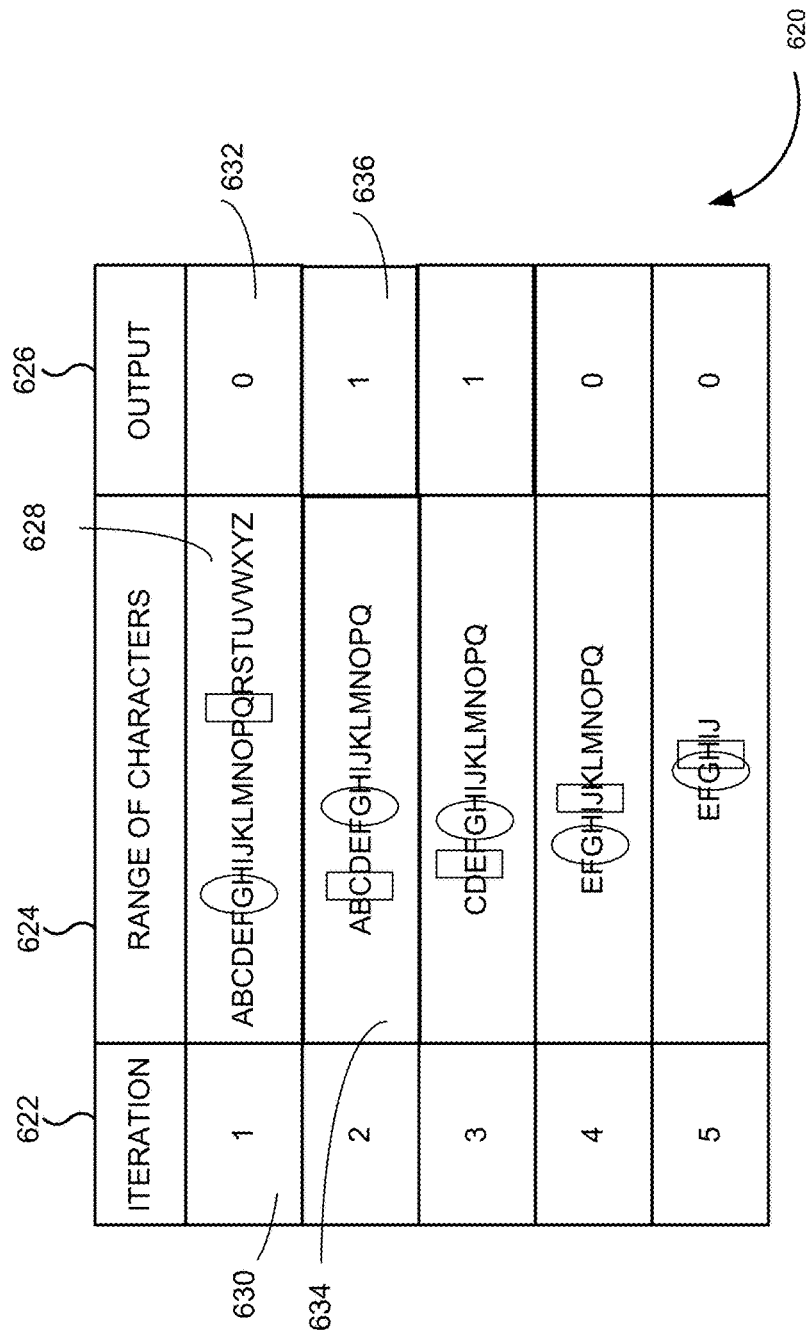
FIG. 6B shows an exemplary table 620 showing various iterations of the encoding operation of the searchable encryption system of FIG. 6A, according to one aspect of the present disclosure.

Referring to FIG. 6B, table 620 shows for each iteration in column 622, the corresponding character range in column 624 and the output of the compare logic for each iteration in column 626. For simplicity, only words with uppercase characters will be described. For example, if the word to be encoded is "GOLD", initial encoding starts with encoding the first character "G". The character G is fed to the encryption logic 604 as a first input character and the encryption logic 604 is configured to generate a random character as an output, for example, a random character between A-Z, which defines the first range of characters. Let us assume, the first generated random character output is Q.

Now, the first input character "G" is compared with the first generated random character output "Q" by the compare logic 606 to see if it is higher in position or lower in position relative to the first generated random character output, within the range shown in cell 628 which corresponds to the first iteration 630. In this case, as character G is lower in position to the first generated random character output Q, a binary value of "0" is output as the first bit of the encoded data, as shown in cell 632. Additionally, the first generated random character output Q defines the upper bound (as character Q is higher in position relative to character G) for the range of characters to be used in the next iteration, for example, second range of characters A-Q.

Next, the first generated random character output (in this case character "Q") is input to the encryption logic 604 and the encryption logic outputs a second generated random character output, within the second range of characters, as shown in cell 634. As one skilled in the art appreciates, the second range of characters is A-Q and the range of characters the encryption logic can output will be configured to be between A-Q. Let us assume, the second generated random character is character "C".

Now, the first input character is again compared with the second generated random character output to see if it is higher in position or lower in position relative to the second generated random character output. In this case, as character G is higher in position to the second generated random character output C, a binary value of "1" is output as the second bit of the encoded data, as shown in cell 636. Additionally, the second generated random character output C defines the lower bound (as character C is lower in position relative to character G) for the range of characters to be used in the next iteration, for example, third range of characters C-Q.

Now, the second generated random character output C is input to the encryption engine 604 and the encryption engine 604 outputs a third generated random character output. In this case, the third range of characters the encryption engine 604 can output is be configured to be within the third range of characters C-Q. Let us assume, the third generated random character is character "E", with a "1" assigned to the third bit of the encoded data, based on the comparison. Additionally, the third generated random character output E defines the lower bound (as character E is lower in position relative to character G) for the range of characters to be used in the next iteration, for example, fourth range of characters E-Q.

Similarly, referring to iteration 4, fourth generated random character is character "J" with an output of "0" as the forth bit of the encoded data, based on the comparison. Additionally, the fourth generated random character output J defines the upper bound (as character J is higher in position relative to character G) for the range of characters to be used in the next iteration, for example, fifth range of characters E-J.

Similarly, referring to iteration 5, the fifth generated random character is character "H", with a "0" assigned to the fifth bit of the encoded data, based on the comparison. This process is repeated until there are two or less characters left before and after the first input character, at which time, the encoding stops. So, in this case, as there are only two characters E and F before and one character J after the first input character G, the encoding stops. So, the final encoded output for character "G" is "00110".

The rest of the characters "0", "L" and "D" are similarly processed to get their corresponding encoded output. As an example, let the final encoded output for "GOLD" is 0100100010010100000110. As one skilled in the art appreciates, depending upon the random character generated by the encryption engine 604, each character may have different number of bits as their encoded output. Now the final encoded output is transformed into a character representation, using an encode logic 608, which will be described now.

In one embodiment, the character representation of the final encoded output is done by splitting the final encoded output into a plurality of bits of data and assigning a unique character to each unique combination of a plurality of bits. As an example, four bits may be used to represent 16 different unique combinations, with each combination assigned a specific character. For example, a base-16 encoding may be used and sixteen characters, characters B-Q assigned to the base-16 encoded data. As an example, 0000 may be encoded as character B and 1111 may be encoded as character Q. With base-16 encoding, other characters may be available for assignment for special purposes or for padding. Other random assignments of characters to the base-16 encoded data are also possible. In some embodiments, dummy characters may be padded in the beginning and the end of the range, so that a lowest character in the character range will not encode as all zeros and highest character in the character range will not encode as all ones.

In one embodiment, in order to provide case insensitive search capability, the encoded output is mapped into lower-case characters, for example, characters b-q. Then, specific characters of the mapped word is capitalized, based on the capitalization of the original input word. For example, if the input word was Mom, and the final output is mapped into character combination "def", then, based on the capitalization of the original input word, the mapped character combination is modified to be "Def". A case sensitive and a case insensitive search on "mom" would return the appropriate results.

In some situations, the final encoded output may result in a mapped word that may have less characters than the original input word. As an example, for a three character input word, the encoded output may only generate two mapped characters. In such a situation, at least one character that is not used in the output mapping (as only 16 characters are used in a base-16 encoding) may be used as a padding character. Preferably, the padding character should sort before all other used characters. As an example, if the characters B-Q are used for mapping, character A may be used as a padding character to be added to the mapped characters. Character A would sort before the characters B-Q.

As an example, if the input of Mom mapped into "De", then with the added padding, the modified mapped characters will be Dea, which will have the same number of characters as the original input character. If the original input was "moM" and the input mapped into "De", then the modified mapped characters will be "deA", which preserves both the number of characters of the original input and the case of the characters of the original input.

In the above examples, only characters A-Z were considered. In order to expand the search and sortable encryption capabilities to characters outside the A-Z range, one or more escape characters may be pre-pended and/or post-pended to the input word. The escape character may indicate the characteristics of the word being encrypted. As an example, unique escape characters may be pre-pended to the input word to indicate if the input word is a character less than the number "0", numbers between 0-9, numbers greater than 9 but less than A, letters A-Z, single byte character greater than "Z", Unicode character in the range U+0080 to U+00FF, Unicode character in the range U+0100 to U+FFFF, Unicode character in the range U+10000 to U+10FFFF and the like.

Additionally, a unique escape character may be post-pended to the input word to indicate "end of word".

As one skilled in the art appreciates, in one embodiment, the searchable encryption system 600 may additionally have a decode logic 612 to receive the encoded word 614 and output the decoded word character string. The decode logic 612 would receive the encoded characters of the encoded word as an input, perform the manipulation necessary to decode the encoded characters one character at a time and reassemble the encoded word as a decoded word. An exemplary decoding operation will be further described with reference to FIG. 6C with table 650.

Referring to FIG. 6C, table 650 shows for each iteration in column 652, the input bit 654 from the encoded word, corresponding character range in column 656. For simplicity, only decoding of character "G" of the encoded word will be described. For example, the character "G" was encoded as "00110". Iteration 0 refers to the initial set up of the range of characters, for example, first range of characters 658, which will be from A-Z. In iteration 1, the input bit is "0" and the input bit "0" is fed to the decode logic 612. The decode logic 612 generates first random range character Q as an output, based on the input bit of "0". Since input bit was a "0", character Q defines the upper bound for the next range of characters to be used in the decoding process. Now, the second range of characters 660 is defined to be from A-Q, based on the generated first random range character "Q".

Next, in iteration 2, next input bit of "1" is input to the decode logic 612. The decode logic 612 generates second random range character C as an output, based on the input bit of "1". As the input bit was a "1", character C+1 defines the lower bound for the next range of characters to be used in the decoding process. Now, the third range of characters 662 is defined to be from D-Q, based on the generated second random range character "C".

Next, in iteration 3, next input bit of "1" is input to the decode logic 612. The decode logic 612 generates third random range character E as an output, based on the input bit of "1". As the input bit was a "1", character E+1 defines the lower bound for the next range of characters to be used in the decoding process. Now, the fourth range of characters 664 is defined to be from F-Q, based on the generated third random range character "E".

Next, in iteration 4, next input bit of "0" is input to the decode logic 612. The decode logic 612 generates fourth random range character J as an output, based on the input bit of "0". As the input bit was a "0", character "J" defines the upper bound for the next range of characters to be used in the decoding process. Now, the fifth range of characters 666 is defined to be from F-J, based on the generated fourth random range character "J".

Next, in iteration 5, next input bit of "0" is input to the decode logic 612. The decode logic 612 generates fifth random range character H as an output, based on the input bit of "0". As the input bit was a "0", character "H" defines the upper bound for the next range of characters to be used in the decoding process. Now, the sixth range of characters 668 is defined to be from F-H, based on the generated fifth random range character "H".

Now, the fifth range of characters 668 is narrowed down to three characters, F, G and H. The middle character "G" is chosen as the decoded character for the encoded input word. Similarly, rest of the encoded input words are decoded to generate the original word "GOLD".

Securing Encryption Keys:

As previously discussed, in order to generate the same encrypted data, there is a need to use a fixed hard coded salt. In some embodiments, an initialization vector (IV) is used as part of the encryption scheme. As one skilled in the art appreciates, in some embodiments, the fixed hard coded salt may be similar to an initialization vector. As an example, various operating modes of AES encryption scheme use initialization vector during the encryption process. Exemplary AES encryption modes may include cipher block chaining mode (CBC mode) and cipher feedback mode (CFB).

Figure 7D:
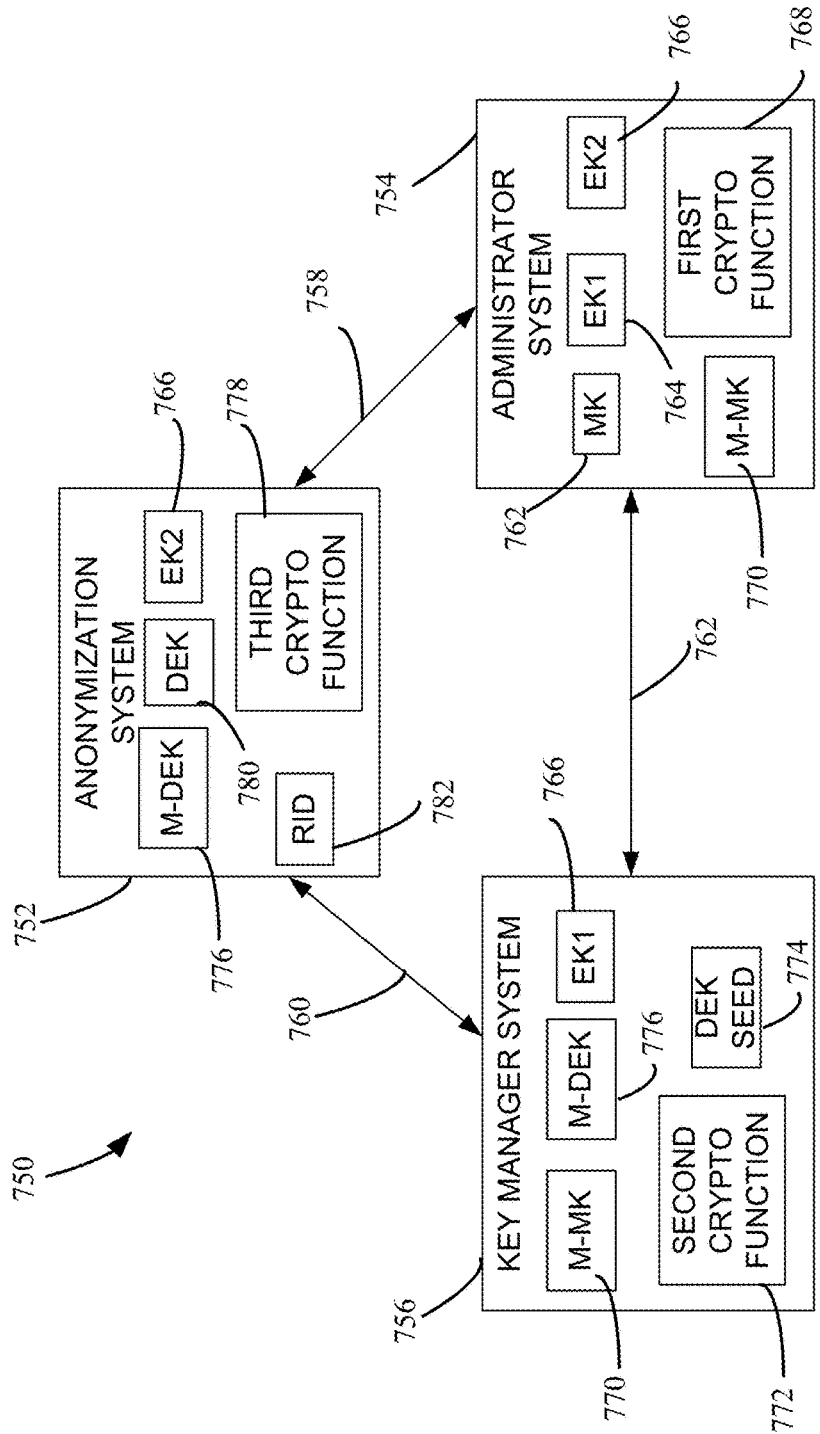
FIG. 7D shows an example system to anonymize data, with an anonymization system, a key manager system and an administrator system.

Now, referring to FIG. 7A, an exemplary crypto module 702 is described. Crypto module 702 may be similar to crypto module 420 of anonymization system 402. The crypto module 702 includes a crypto engine 704 that receives the initialization vector 706 from an initialization vector generator 708. The crypto engine 704 also receives a data encryption key 710 from key store 712. The crypto engine is also configured to receive the input data 714. The input data 714 is processed by the crypto engine 704, using the data encryption key 710 and the initialization vector 706 to generate the encrypted output data 716.

The initialization vector generator 708 may include a PRNG function module 720. As previously described, a seed 722 is fed to the PRNG function module. Seed 722 may be generated by a seed generator 724. Based on the value of the seed 722, the PRNG function module 720 generates the initialization vector 706. The Initialization vector generator 708, key store 712 and seed generator 724 may be part of the anonymization system 402.

In order to prevent unauthorized access to the data encryption key 710, it is preferable that the data encryption key 710 is not stored in plain text. An exemplary system and method to secure the data encryption key 710 is now described, with reference to FIG. 7B-7C.

Now, referring to FIG. 7B, the data encryption key 710 is encrypted with a key encryption key 720, to generate an encrypted data encryption key 722. In one embodiment, the key encryption key 720 may be a randomly generated key. In one embodiment, the encrypted data encryption key 722 is stored in the key store 712. In order to secure the key encryption key 720, the key encryption key 720 is encrypted using a KEK key 722 to generate an encrypted key encryption key 724. The encrypted key encryption key 724 is stored in the key store 712. In some embodiments, the KEK key 723 may be a password or a code only known to one or more administrative users, who may be sometimes referred to as a key custodian. In one embodiment, using an hash function 726, a hash of the KEK key 728 is generated and stored in the system, along with the hash function 726. Preferably, the hash function 726 is a one way hash, so that by knowing the hash of the KEK key 728 and the hash function 726, the KEK key 723 may not be derived. However, when the KEK key 723 is hashed with the hash function 726, it will generate the hash of the KEK key 728.

When a string of input key 730 is provided by the custodian to the system, as a KEK key, the string of input key 730 is hashed with the hash function 726 to generate a hash of the string of input key 732. This generated hash of the string of input key 732 is compared with the stored hash of the KEK key 728. If there is a match, then, the string of input key 730 is confirmed as the KEK key 728. The confirmed KEK key 728 is then used to decrypt the encrypted key encryption key 724 to derive the key encryption key 720. The key encryption key 720 is then used to decrypt the encrypted data encryption key 722 to derive the data encryption key 710. The derived data encryption key 710 is then used by the encryption engine to encrypt the input word.

In some embodiments, a plurality of KEK key 728 may be used to encrypt the key encryption key 720, to generate a plurality of encrypted key encryption key 724. For example, referring to FIG. 7C, table 740 shows various combinations of KEK key 728, encrypted key encryption key 724 and corresponding hash of the KEK key 728. As an example, column 742 shows various KEK key 723, column 744 shows various encrypted key encryption key 724 and column 746 shows hash of the KEK key 728.

Now referring to row 748, the KEK key 1 is used to generate the encrypted key encryption key EKEK 1. Additionally, the hash of KEK Key 1 with the hash function 726 generates the hash of KEK key, H-KEKK-1. Similarly, referring to row 749, the KEK key 2 is used to generate the encrypted key encryption key EKEK 2. Additionally, the hash of KEK Key 2 with the hash function 726 generates the hash of KEK key, H-KEKK-2. In one embodiment, each custodian is given one of the plurality of the KEK key 723. A validation system may be set up, wherein more than one custodian needs to provide the corresponding KEK key 728 and confirmation of the validity of a plurality of KEK key 723 (by a match of the hash of KEK key, as previously described) is needed to decrypt the encrypted key encryption key. As one skilled in the art appreciates, the hash of the KEK key may be indexed to link to the corresponding encrypted key encryption key.

Split Key Implementation:

In one embodiment, the KEK key 723 may be divided into a plurality of sub-KEK keys 734 and each of the sub-KEK keys 734 may be distributed to a plurality of custodians. Upon validation of each of the sub-KEK keys 734 by a plurality of custodians, the KEK key 723 may be reassembled, using the validated plurality of sub-KEK keys 734. In one embodiment, the validation of sub-KEK keys 734 may be distributed to different computing systems. These computing systems may be isolated from each other, for example, physically isolated or logically isolated. Upon validation, the sub-KEK keys 734 may be securely transmitted to a central system to reassemble the KEK key 723. As one skilled in the art appreciates, such a distributed system may provide for one or more of improved redundancy, security etc.

As one skilled in the art appreciates, each key encryption keys may be divided into a plurality of sub-key encryption keys 736. Each of the sub-key encryption keys 736 may have a corresponding sub-KEK key and a hash function, to generate a hash of the sub-KEK key. In one embodiment, the validation of sub-KEK keys may be distributed to different computing systems. These computing systems may be isolated from each other, for example, physically isolated or logically isolated. Upon validation, the sub-KEK keys may be used to decrypt the sub-key encryption keys. Decoded sub-key encryption keys may be securely transmitted to a central system to reassemble the key encryption keys. As one skilled in the art appreciates, such a distributed system may provide for one or more of improved redundancy, security etc.

As one skilled in the art appreciates, each data encryption key may be divided into a plurality of sub-data encryption keys 736. Each of the sub-data encryption keys 736 may have a corresponding sub-key encryption key 738. Using a sub-KEK key 732, each sub-key encryption key 738 may be encrypted. Using the sub-KEK key 732 and a hash function, a hash of the sub-KEK key 739 may be generated. In one embodiment, the sub-data encryption key 736 may be distributed to different computing systems. These computing systems may be isolated from each other, for example, physically isolated or logically isolated. As previously discussed, upon validation of a sub-KEK key, the sub-KEK key may be used to decrypt the sub-key encryption key. Decoded sub-key encryption key may be used to decode the sub-data encryption key. The decoded sub-data encryption keys from different computing systems may be securely transmitted to a central system to reassemble the data encryption key. As one skilled in the art appreciates, such a distributed system may provide for one or more of improved redundancy, security etc.

In some embodiments, various fields described with reference to FIG. 7B may be stored in the data store 712. In some embodiments, one or more crypto modules 420 described with reference to FIG. 4B may be configured to perform encryption, hashing and the like.

Key Management System

In some examples, a key manager system may be provided to generate and store various keys used by an anonymization system. Now, referring to FIG. 7D, an example system 750 is described. The system 750 includes an anonymization system 752, an administrator system 754 and a key manager system 756. In some examples, the anonymization system 752 may be similar to the anonymization system previously described with reference to FIG. 4A and FIG. 7A. Anonymization system 752 communicates with administrator system 754 over link 758. The anonymization system 752 communicates with key manager system 756 over link 760. The administrator system 754 communicates with key manager system 756 over link 762.

In some examples, the communication between the anonymization system 752, key manager system 756 and the administrator system 754 may be configured to occur over a secure channel. In some examples, there may be mutual authentication between the communicating systems before data is transmitted over the links 758, 760 and 762. For example, a transport layer security (TLS) protocol or secure socket layer (SSL) protocol may be used to communicate over links 758, 760 and 762.

In some examples, the anonymization system 752, administrator system 754 and key manager system 756 may be physically separate systems. In some examples, the anonymization system 752, administrator system 754 and key manager system 756 may be logically separate systems. In yet another example, the anonymization system 752, administrator system 754 and key manager system 756 may be a combination of physically or logically separate system.

In some examples, it may be desirable to distribute key generation function to different systems. For example, the administrator system 754 may be used to initially generate one or more keys that may be used to generate subsequent keys or mask the generated keys. An example implementation of a masking system to be used with the key manager system 756 and the anonymization system 752 will now be described.

In one example, the administrator system 754 is provided with a master key (MK) 762, a first encryption key (EK1) 764 and a second encryption key (EK2) 766. The administrator system 754 further includes a first crypto function 768. Now, referring to FIG. 7E, the master key 762 and the first encryption key 764 is fed to the first crypto function 768 as input to generate a masked master key (M-MK) 770 as the output. In one example, the first crypto function 768 is a one way crypto function. In other words, using the output of the first crypto function 768 and the first encryption key 764 as an input, it is not possible to generate the master key 762 as an output. In one example, the first crypto function may implement a discrete logarithmic technique based function to provide a one way crypto function Now, referring back to FIG. 7D, the masked master key 770 and the first encryption key 764 is transmitted to the key manager system 756 over link 762. The masked master key 770 and first encryption key 764 is stored in the key manager system 756, for example, in a data store. Also, the second encryption key 766 is transmitted by the administrator system 754 to anoymization system 752 over link 758. The second encryption key 766 is stored in the anonymization system 752, for example, in a data store.

The key manager system 756 includes a second crypto function 772. Now, referring to FIG. 7F, the masked master key 770 and a DEK seed 774 is fed to the second crypto function 772 as input to generate a masked data encryption key (M-DEK) 776 as the output.

Now, referring back to FIG. 7D, the generated masked data encryption key 776 may be stored in the key manager system 756, for example, in a data store. In one example, a request for a data encryption key is received by the key manager system 756. For example, the anonymization system 752 may generate a request for a data encryption key and send the request to the key manager system 756. Upon receipt of the request, the key manager system 756 generates a masked data encryption key, as previously described with reference to FIG. 7F. The generated masked data encryption key is sent to the anonymization system 752, in response to the received request for the data encryption key.

The anonymization system 752 includes a third crypto function 778. In one example, the second crypto function 772 and the third crypto function 778 are configured such that effect of first encryption key 764 on the masked data encryption key 776 generated using the second crypto function 772 is negated by the second encryption key 766 using the third crypto function 778. Now, referring to FIG. 7G, the masked data encryption key 774 and the second encryption key 766 are fed to the third crypto function 778 as input to generate the data encryption key (DEK) 780 as the output. In other words, the third crypto function 778 and the second encryption key 776 de-masks the masked data encryption key. In one example, the first encryption key 764 and second encryption key 776 may correspond to a public key—private key pair. For example, the first encryption key 764 may be the public key and second encryption key may be the private key of the public key—private key pair. In some examples, the second crypto function 772 and third crypto function 778 are configured such that master key 762 may not be derived from the masked master key 770, masked DEK 776 and second encryption key 766.

In one example, the request for the data encryption key from the anonymization system 752 includes a request identifier 782. In some examples, the key manager system 756 may maintain a table cross-referencing the request identifier and the generated masked data encryption key. FIG. 7H shows an example table 784, with column 786 storing request identifier 782 and column 788 storing corresponding masked data encryption key 776. If there is a subsequent request for a data encryption key and the request identifier matches a stored request identifier in table 784, in one example, the corresponding masked data encryption key may be returned as a response to the request.

In some examples, the key manager system 756 may maintain a table cross-referencing the request identifier and the DEK seed value used to generate the masked data encryption key. FIG. 7J shows an example table 790, with column 792 storing request identifier 782 and column 794 storing corresponding DEK seed 774. If there is a subsequent request for a data encryption key and the request identifier matches a stored request identifier in table 790, in one example, the corresponding stored DEK seed 774 along with the masked master key 770 to generate a masked data encryption key using the second crypto function 772 as previously described with reference to FIG. 7G. The generated masked data encryption key is returned by the key manager system 756 as a response to the request for the data encryption key from the anonymization system 752.

As one skilled in the art appreciates, in the example system 750 described hereinabove, if the key manager system 756 is compromised, neither the master key nor the data encryption key may be derived from the masked master key and the masked data encryption key. In other words, without the second encryption key, the masked data encryption key may not be decrypted or de-masked to obtain the data encryption key. Further, the master key may not be derived with the first encryption key, as previously described. In yet another example, if the anonymization system 752 is compromised, the data encryption key may not be derived without access to the masked data encryption key. In some examples, the master key may not be derived, even if both the key manager system 756 and the anonymization system 752 are compromised.

Figure 8A:
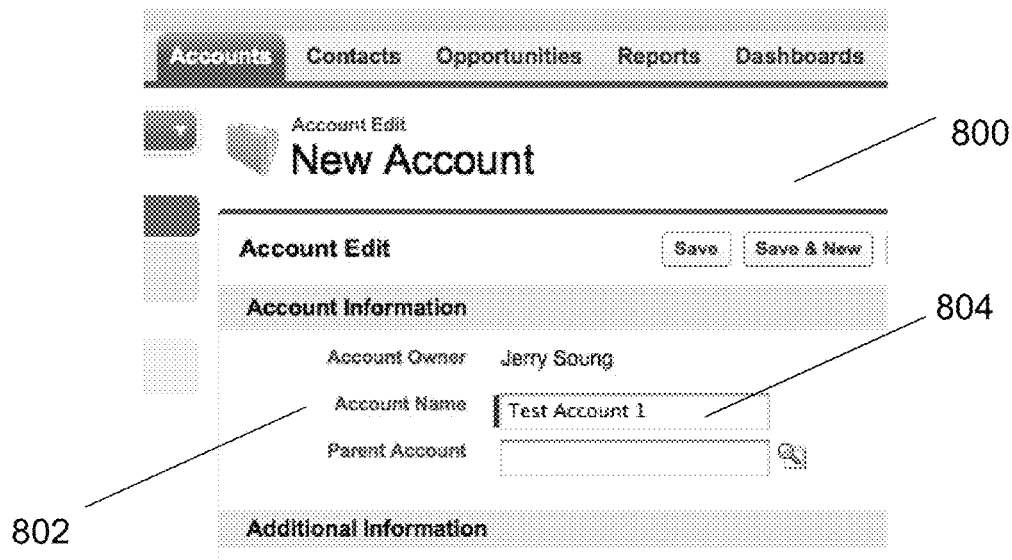

Now referring to FIGS. 8A-8C and FIGS. 9A-9C an exemplary anonymization implementation will be described. Referring to FIG. 8A, a screen shot 800 presented on a user computer to open a new account for an application running on a hosted cloud is shown. More specifically, the data field 802 refers to the Account Name and the corresponding data for the Account Name is entered in the form field 804. For example, the Account Name entered is "Test Account 1".

FIG. 8B shows the "POST" action data as transmitted to the hosted cloud, without anonymization. More specifically, reference numeral 804-1 shows the post data that corresponds to the Account Name. As one skilled in the art appreciates, it is not difficult to ascertain the Account Name as "Test Account 1".

FIG. 8C shows the "POST" data as transmitted to the host cloud, with an embodiment of the anonymization technique described in this disclosure. More specifically, reference numeral 804-2 shows the anonymized data that corresponds to the Account Name. FIG. 8D shows various parts of the anonymized data.

Referring to FIG. 8D, the anonymized data 804-2 includes two anonymized data fields 804-21 and 804-22. The first data field 804-21 corresponds to the word "Test" and the second data field 804-22 corresponds to the word "Account". Additionally, the preamble 806 for the first data field is TPF1. The postamble 808 for the first data field is 1TSF. Similarly, the preamble 810 for the second data field is TPF1 and the postamble 812 for the second data field is 1TSF1.

Figure 9A:
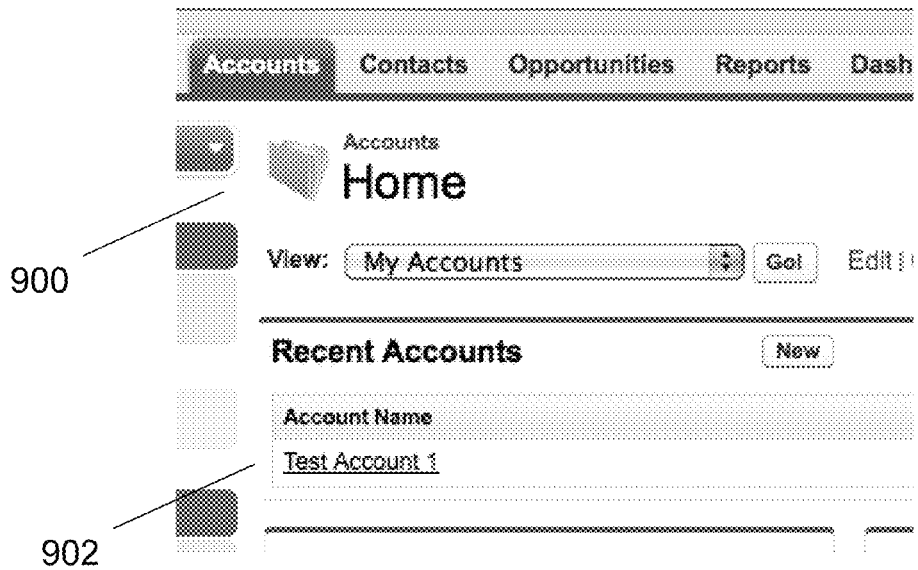

Now, referring to FIG. 9A, a screen shot 900 presented on a user computer to view accounts set up for an application running on a hosted cloud is shown. More specifically, the screen shot 900 shows the list of account names that have been set up, for example, account name 902 referring to Test Account 1 that is received in response to a GET action initiated by the user computer to the application hosted on the hosted cloud.

FIG. 9B shows the HTML code 904 constructed by the application hosted on the hosted cloud in response to the GET action. More specifically, the anonymized values 906 of the account name is returned in the HTML code 904. The anonymized value 906 corresponds to the anonymized data 904-2.

FIG. 9C shows the HTML code 908 constructed after processing the received HTML code 904 from the hosted cloud and de-anonymize the anomymized data field 906. More specifically, the HTML code 908 includes the de-anonymized value as shown in data field 910. The HTML code 908 with de-anonymized value for Account Name data field is sent to the user computer, in response to the GET action initiated by the user computer.

Figure 10:
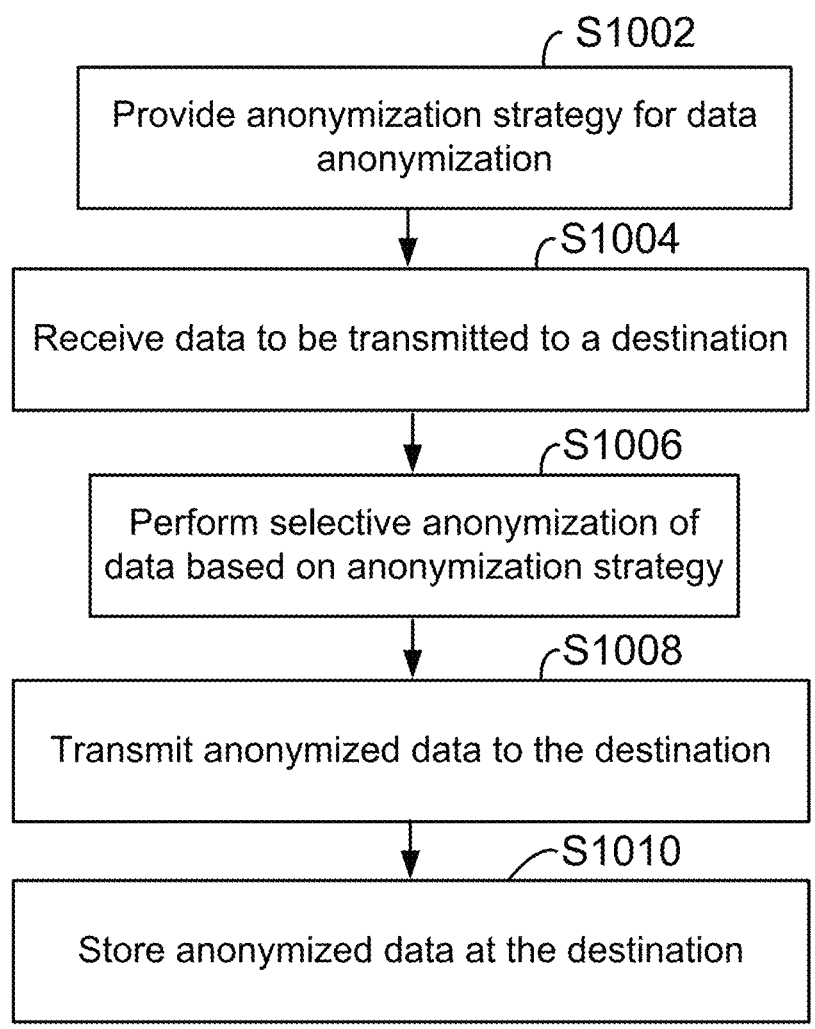
FIG. 10 shows method of anonymizing data to be transmitted to a destination computing, according to one aspect of the present disclosure.

Now, referring to FIG. 10, a method of anonymization of data to be transmitted to a hosted cloud is described. In block S1002, an anonymization strategy for data anonymization is provided. In one embodiment, the anonymization strategy is stored in a anonymization strategy module 406. In one embodiment, a management console module 404 may query applications running on the hosted cloud and present and receive meta data (or data schema, data definitions) of each application. The management console module 404 may present the available anonymization strategies for each data field of the meta data to the user computer. The user may select one or more of the anonymization strategies to be applied to various data fields of the application.

The selected anonymization strategy is stored by the management console module 404 in the anonymization strategy module 406, for later use by other modules of the anonymization system 402. The anonymization strategy may be stored as a table in the anonymization strategy module 406. The anaonymization strategy in one embodiment may include schema definition for data manipulation. An exemplary selected anonymization strategy is described with reference to FIG. 5.

In block S1004 data to be transmitted to a destination is received. In one embodiment, the data to be transmitted to a destination is received by the anonymizaton system from the user computer.

In block S1006, selective anonymization of data based on anonymization strategy is performed. For example, an anonymization strategy may be selected based on the data field and corresponding anonymization strategy, as shown and described with reference to FIG. 5. An exemplary anonymization of data may be performed, as described with reference to FIGS. 8A-8D.

In block S1008, the anonymized data is transmitted to the destination. In one embodiment, the anonymized data is transmitted to the application running on the hosted cloud. An exemplary transmission of anonymozed data was at least described with reference to FIGS. 8A-8D.

In block S1010, the anonymized data is stored in the destination. For example, the anonymized data may be stored in a database coupled to an application server, as shown in FIG. 3.

Figure 11A:
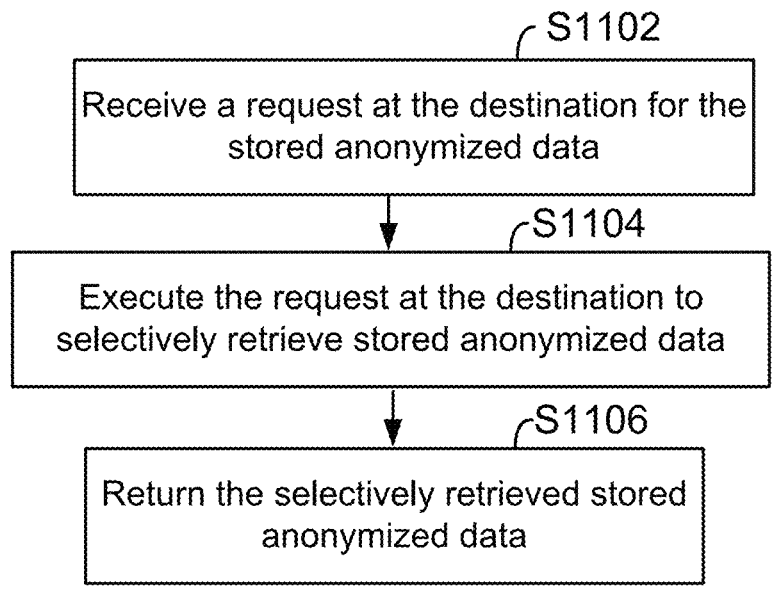
FIG. 11A shows method of processing a request for stored anonymized data by the destination computing device.

Now referring to FIG. 11A, an exemplary method of processing a request at the destination is described. In block S1102, a request for the stored anonymized data is received at the destination. For example, as described with reference to FIGS. 9A-9C, a GET action request is received at the application running on a hosted cloud.

In block S1104, the request is executed at the destination to selectively retrieve stored anonymized data. As an example, the application server running on the hosted cloud processes the GET action and retrieve anonymized data corresponding to the GET action from a user computer.

In block S1106, the selectively retrieved stored anonymized data is returned. As an example, the application running on the hosted cloud assembles a response to the GET action and returns the selectively retrieved stored anonymized data, as shown in FIG. 9B.

Figure 11B:
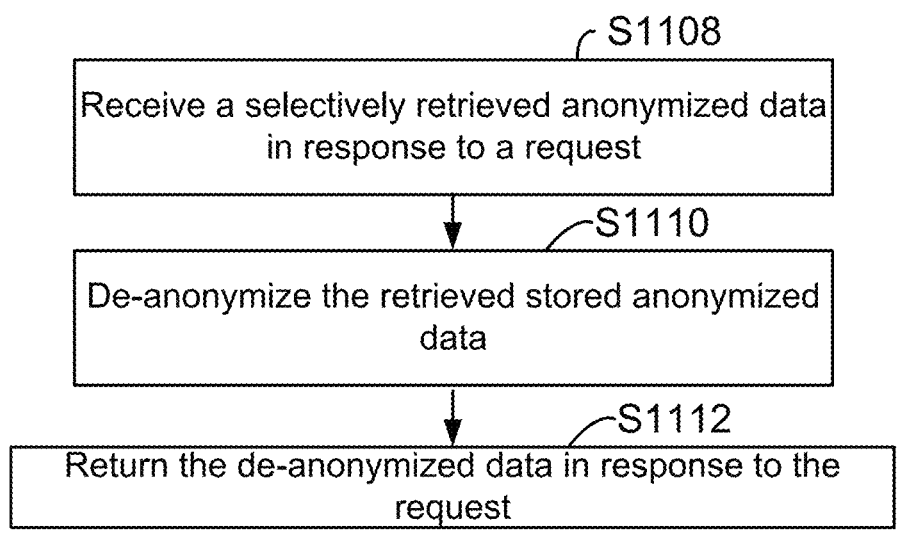
FIG. 11B shows method of processing selectively retrieved anonymized data from the destination computing device.

Now referring to FIG. 11B, an exemplary method or processing a response to a request is described. In block S1108, a selectively retrieved anonymized data is response to a request is received. As an example, a response from the hosted cloud to a GET action is received by the anonymization system 402. The response may be a HTTP response as shown in FIG. 9B.

In block S1110, the retrieved stored anonymized data is de-anonymized. For example, the retrieved anonymized data is evaluated by the de-anonymization module 410. The selective preamble contained in the anonymized data is identified. The de-anonymization module performs the de-anonymization based on the identified preamble and generates the de-anonymized data. An exemplary de-anonymized data is shown in FIG. 9C.

In some embodiments, the preamble may indicate that the anonymized data is compressed and the de-anonymization of the input data with compression may be performed as described with reference to FIGS. 7E and 7F, to generate the input or clear word from the anonymized data.

In block S1112, the de-anonymized data is returned in response to the request. For example, an HTTP response as described with reference to FIG. 9C is returned to the user computer.

As it is apparent to one skilled in the art, data transfers from user applications are selectively anonymized using one or more anonymization techniques, based on selected anonymization strategy. The anonymization of data happens transparently to the user application.

Although in some embodiments, anonymization techniques may have be described with reference to encryption of the input word, these techniques may be adapted and practiced using tokenization as well.

Although in this disclosure reference is made to transmitting anonymized data to a hosted cloud or a destination system located at a third party location, the disclosure is not limited to the disclosed embodiments. In some embodiments, anonymized data may be stored in a user cloud itself. The server application may be any type of application, including word processing applications, mail applications and the like.

Although the hosted cloud has been described with one or more servers and databases, these clouds may be implemented with additional servers and databases that may act as redundant systems or cumulative systems.

As one skilled in the art appreciates, various embodiments of this disclosure may provide one or more of the following benefits. For example, anonymization of transmitted data may occur transparent to the user application. Anonymized data may be sortable, based on the selected anonymization strategy. Anonymized data may be searchable, based on the selected anonymization strategy. Anonymized data may be subjected to case-insensitive search, based on the selected anonymization strategy. Portions of a data field may be anonymized, retaining other portion of the data field in its original form. Portions of the data field retained in its original form may be bypassed from the anonymization process and system, which may lead to improved overall performance of the anonymization system.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for anonymizing data, comprising:
receiving data to be anonymized by an anonymization system executed on a computing device, the data including a plurality of characters;
generating a request for a data encryption key with a corresponding request identifier;
generating a masked data encryption key corresponding to the request identifier for the data encryption key by
providing a first encryption key, a second encryption key and a master key;
masking the master key with the first encryption key using a computer implemented first crypto function to generate a masked master key; and
generating the masked data encryption key using a computer implemented second crypto function and the masked master key;
storing the corresponding request identifier in a data store and associating the generated masked data encryption key with the stored corresponding request identifier;
receiving the masked data encryption key in response to the request;
retrieving the data encryption key from the received masked data encryption key;
anonymizing the data using an anonymization module to derive anonymized data using the retrieved data encryption key;
receiving a subsequent request for a data encryption key with an associated request identifier; and
verifying if there is a match between the associated request identifier and the stored corresponding request identifier, and
when there is a match, returning the masked data encryption key associated with the stored corresponding request identifier; and
when there is no match, generating a new masked data encryption key and responding with the generated new masked data encryption key.

2. The method of claim 1, wherein retrieving the data encryption key further including de-masking the masked data encryption key using a third crypto function and the second encryption key.

3. The method of claim 1, wherein the first crypto function is configured such that the master key may not be derived from the masked master key and the first encryption key.

4. The method of claim 3, wherein the second crypto function and the third crypto function are configured such that effect of first encryption key on the masked data encryption key generated using the second crypto function is negated by the second encryption key using the third crypto function.

5. The method of claim 1, wherein,
the first crypto function is executed in an administrator system;
the second crypto function is executed in a key manager system; and
the third crypto function is executed in the anonymization system.

6. The method of claim 5, further including:
receiving the request for the data encryption key by the key manager system;
generating the masked data encryption key by the key manager system; and
responding with the masked data encryption key by the key manager system.

7. The method of claim 5, wherein the administrator system transmits the masked master key to the key manager system and transmits the second encryption key to the anonymization system.

8. The method of claim 1, further including:
feeding a data encryption key (DEK) seed and the masked master key to the second crypto function as input to generate the masked data encryption key.

9. The method of claim 8, wherein associating the generated masked data encryption key with the stored corresponding request identifier further including associating the DEK seed corresponding to the generated masked data encryption key with the stored corresponding request identifier; and
wherein returning the masked data encryption key associated with the stored corresponding request identifier further including regenerating the masked data encryption key by using the masked master key and the DEK seed corresponding to the stored corresponding request identifier and responding with the regenerated masked data encryption key.

10. A system to anonymize data, comprising:
an anonymization system executed on a computing device configured to
receive data to be anonymized, the data including a plurality of characters;
generate a request for a data encryption key with a corresponding request identifier;
receive a generated masked data encryption key that corresponds the request identifier in response to the request,
wherein, a masked master key is generated by masking a master key with a first encryption key using a computer implemented first crypto function; and
the masked data encryption key is generated using a computer implemented second crypto function and the masked master key;
and wherein, the corresponding request identifier is stored in a data store and the corresponding request identifier is associated with the generated masked data encryption key;
retrieve the data encryption key from the received masked data encryption key;
anonymize the data using an anonymization module to derive an anonymized data using the retrieved data encryption key; and
wherein the system is further configured to
receive a subsequent request for a data encryption key with an associated request identifier;
verify if there is a match between the associated request identifier and the stored corresponding request identifier, and
when there is a match, return the masked data encryption key associated with the stored corresponding request identifier; and
when there is no match, generate a new masked data encryption key and respond with the generated new masked data encryption key.

11. The system of claim 10, wherein a third crypto function configured to retrieve the data encryption key by de-masking the masked data encryption key using the second encryption key.

12. The system of claim 10, wherein the first crypto function is configured such that the master key may not be derived from the masked master key and the first encryption key.

13. The system of claim 12, wherein the second crypto function and the third crypto function are configured such that effect of first encryption key on the masked data encryption key generated using the second crypto function is negated by the second encryption key using the third crypto function.

14. The system of claim 10, wherein,
- the first encryption function is executed in an administrator system;
- the second crypto function is executed in a key manager system; and
- the third crypto function is executed in the anonymization system.

15. The system of claim 14, wherein the key manager system
- receives the request for the data encryption key;
- generates the masked data encryption key; and
- responds with the masked data encryption key.

16. The system of claim 14, wherein the administrator system transmits the masked master key to the key manager system and transmits the second encryption key to the anonymization system.

17. The system of claim 10, wherein a data encryption key (DEK) seed and the masked master key is fed to the second crypto function as input to generate the masked data encryption key.

18. The system of claim 17, wherein the DEK seed that corresponds to the generated masked data encryption key is associated with the stored corresponding request identifier; and
- when there is a match between the associated request identifier and the stored corresponding request identifier, the masked data encryption key associated with the stored corresponding request identifier is regenerated by using the masked master kwy and the DEK seed associated with the stored corresponding request identifier.

* * * * *